(12) United States Patent
Heim

(10) Patent No.: US 7,481,322 B2
(45) Date of Patent: Jan. 27, 2009

(54) RACK FOR VEHICLES, PREFERABLY HAT RACK

(75) Inventor: Andreas Heim, Esslingen (DE)

(73) Assignee: Marlok Automotive GmbH, Esslingen (DE)

( * ) Notice: Subject to any disclaimer, the term of this patent is extended or adjusted under 35 U.S.C. 154(b) by 611 days.

(21) Appl. No.: 11/101,229

(22) Filed: Apr. 6, 2005

(65) Prior Publication Data

US 2005/0263461 A1 Dec. 1, 2005

(30) Foreign Application Priority Data

Apr. 6, 2004 (DE) .................... 10 2004 018 431

(51) Int. Cl.
*A47F 7/06* (2006.01)
(52) U.S. Cl. .................................... 211/30
(58) Field of Classification Search ............. 211/30, 211/31, 32, 85.3, 13.1; 248/291, 309.1; 206/9
See application file for complete search history.

(56) References Cited

U.S. PATENT DOCUMENTS

| | | | | | |
|---|---|---|---|---|---|
| 1,387,341 | A | * | 8/1921 | Behning | 211/31 |
| 1,511,864 | A | * | 10/1924 | Altmyer | 211/31 |
| 1,908,450 | A | * | 5/1933 | Rutherford | 211/31 |
| 2,074,615 | A | * | 3/1937 | Look | 211/31 |
| 2,923,413 | A | * | 2/1960 | Behrendt | 211/31 |
| 3,226,156 | A | * | 12/1965 | Hamlin | 297/188.03 |
| 4,757,905 | A | * | 7/1988 | Green | 211/31 |
| 4,821,891 | A | * | 4/1989 | Williams | 211/31 |
| 5,074,508 | A | * | 12/1991 | Powers | 248/291.1 |

* cited by examiner

*Primary Examiner*—Sarah Purol
(74) *Attorney, Agent, or Firm*—Reising Ethington, P.C.

(57) ABSTRACT

A hat rack for a vehicle includes a basic member. The basic member consists of at least one dimensionally stable support, which has mountings for a variety of functional parts. The dimensionally stable support advantageously can be bolted to the body of the vehicle and thereby impart great strength, in particular great torsional strength, to the body in the installation region.

56 Claims, 29 Drawing Sheets

RACK FOR VEHICLES, PREFERABLY HAT RACK

CROSS-REFERENCE TO RELATED APPLICATIONS

This application claims priority to German Patent Application No. DE 10 2004 018 431.3 filed on Apr. 6, 2004.

BACKGROUND

The invention relates to a rack for vehicles, preferably a hat rack. Hat racks which are attached to the rear seats of the motor vehicle and to which an elevated brake light or a loudspeaker, for example, are fastened as functional parts are well known in motor vehicles. The racks have a basic member that may consist of metal, of synthetic material or the like. The basic member has only limited strength, so that it can be used essentially for the fastening of simple functional parts as well as for the deposit of objects of little weight.

The object of the invention is to design the generic rack in such a way that it can be optimally used in the vehicle.

According to the invention, this object is accomplished in the present invention.

SUMMARY OF THE INVENTION

In the rack according to the invention the basic member consists of the dimensionally rigid support, which advantageously is bolted to the body of the vehicle. The connection to the body preferably is effected form- and force-lockingly. As a result, the rack according to the invention imparts great strength, in particular great torsional strength, to the body in the region of installation.

Additional features of the invention follow from the additional claims, the description and the drawings.

BRIEF DESCRIPTION OF THE DRAWINGS

The invention is explained in detail by a number of exemplary embodiments represented in the drawings, wherein.

DETAILED DESCRIPTION OF THE PREFERRED EMBODIMENTS

Figure 1:
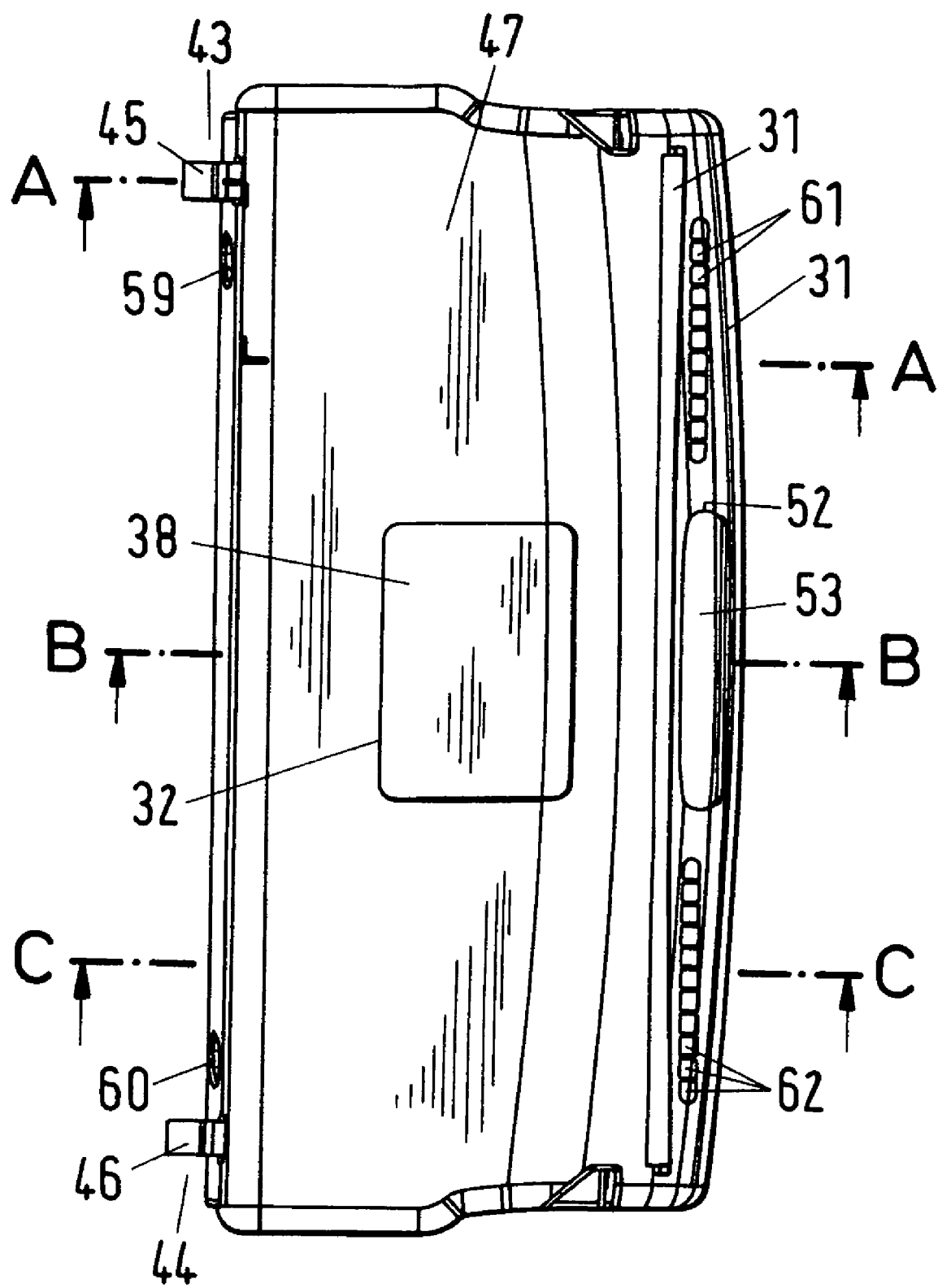
FIG. 1 shows a top view of the rack according to the invention, FIG. 2 and FIG. 3, in a variety of perspective representations respectively, the rack according to the invention, FIG. 4, in enlarged representation, a section along line A-A in FIG. 1, FIG. 5, in enlarged representation, a section along line B-B in FIG. 1, FIG. 6, in enlarged representation, a section along line C-C in FIG. 1, FIG. 7, in perspective representation, the rack according to the invention with a covering, FIG. 8, in perspective representation, the rack according to the invention in a view from below, FIG. 9, in top view, a second embodiment of a rack according to the invention, FIG. 10 and FIG. 11, in a variety of perspective representations respectively, the rack according to the invention of FIG. 9, FIG. 12, in enlarged representation, a section along line D-D in FIG. 9, FIG. 13, in enlarged representation, a section along line E-E in FIG. 9, FIG. 14, in enlarged representation, a section along line F-F in FIG. 9, FIG. 15, in perspective representation, the rack according to the invention of FIG. 9 with a covering, FIG. 16, in perspective representation, the rack according to the invention of FIG. 9 in a view from below, FIG. 17, in perspective representation, the rack according to the invention of FIG. 9 in a view from the front, FIG. 18, a top view of a third embodiment of a rack according to the invention, FIG. 19, the rack according to the invention of FIG. 18 in perspective representation from below, FIG. 20, in enlarged representation, a section along line G-G in FIG. 18, FIG. 21, in enlarged representation, a section along line H-H in FIG. 18, FIG. 22, in enlarged representation, a section along line I-I in FIG. 18, FIG. 23, in perspective and enlarged representation, the fastening of one end of the support of the rack according to the invention in the interior of a motor vehicle, FIG. 24, in section, the fastening region of the support on the motor vehicle, FIG. 25, a cross section through the fastening region of the support on the motor vehicle, FIG. 26, an additional embodiment of the fastening of a support of the rack according to the invention in the interior of the motor vehicle, FIG. 27, in perspective representation, the fastening region on the motor vehicle side for the support of FIG. 26, FIG. 28, a cross section through the fastening region of the support of FIG. 26 on the motor vehicle, FIG. 29, a longitudinal section through the fastening region of FIG. 26.

In the embodiments described below, the rack is designed as a rack and built-in module that is used in motor vehicles and serves as a hat rack. The rack module is designed in such a way that it can perform a plurality of functions.

The module of FIGS. 1 to 8 has a dish-like support 1, which in top view has an approximately rectangular shape. The various modules are seated on this support. The support 1 has a central part 2, which is essentially flat and has an approximately rectangular contour. A depression 3, in which is mounted a take-up shaft 5, rotating about a horizontal axis 4, for a net-type baggage holder 6, adjoins its one longitudinal side. The depression 3 extends over the entire length of the central part 2. The depression 3 is limited by two side walls 8, 9 running convergent in the direction of a floor 7 of the depression. The side wall 8 is inclined more strongly than the side wall 9, which adjoins the central part 2 at an obtuse angle. The side wall 8 connects the floor 7 of the depression 3 with an edge section 10, which lies at the same height as the central part 2. The depression 3 is designed in such a way that the take-up shaft 5, with the wound-up baggage net 6, does not project upward from the depression 3. The side wall 8 has a slot 11 extending in the longitudinal direction, through which the baggage net 6 is guided outward.

Near the opposite longitudinal edge the dish-like support 1 is provided with two recesses 12, which have a smaller cross section than the depression 3 and lie at the same height. The depressions 12 are designed alike and have a flat floor 13, to which two side walls 14, 15, limiting the depression, are adjacent. In the exemplary embodiment the two side walls 14, 15 converge in the direction of the floor 13. The side wall 14 adjoins the central part at an obtuse angle, while the opposite side wall 15 connects the floor 13 of the depression 12 with an edge section 16 of the support 1. The floor 13, like the floor 7, lies parallel to the central part 2, but is at a smaller distance from it than the floor 7 of the opposite depression 3. The edge section 16 lies at the height of the central part 2.

As a comparison of FIGS. 1 and 4 to 6 reveals, the two depressions 12 of the support 1 lie behind one another at a distance apart. The two depressions 12 are designed alike and in each instance have the floor 13, which advantageously is removable and is held resting on the side walls 14, 15. As a result, the floor 13 may if necessary be removed, in order to be able to reach components, preferably illuminating means, accommodated in the depressions 12. The support 1 with the central part 2, the side walls 8, 9 and the floor 7 of the depression 3, as well as the side walls 14, 15 of the depressions 12 and of the edge sections 10, 16, are designed in one piece with each other. The support 1 may be made of metal or another dimensionally rigid material, in particular of synthetic material.

Figure 4:
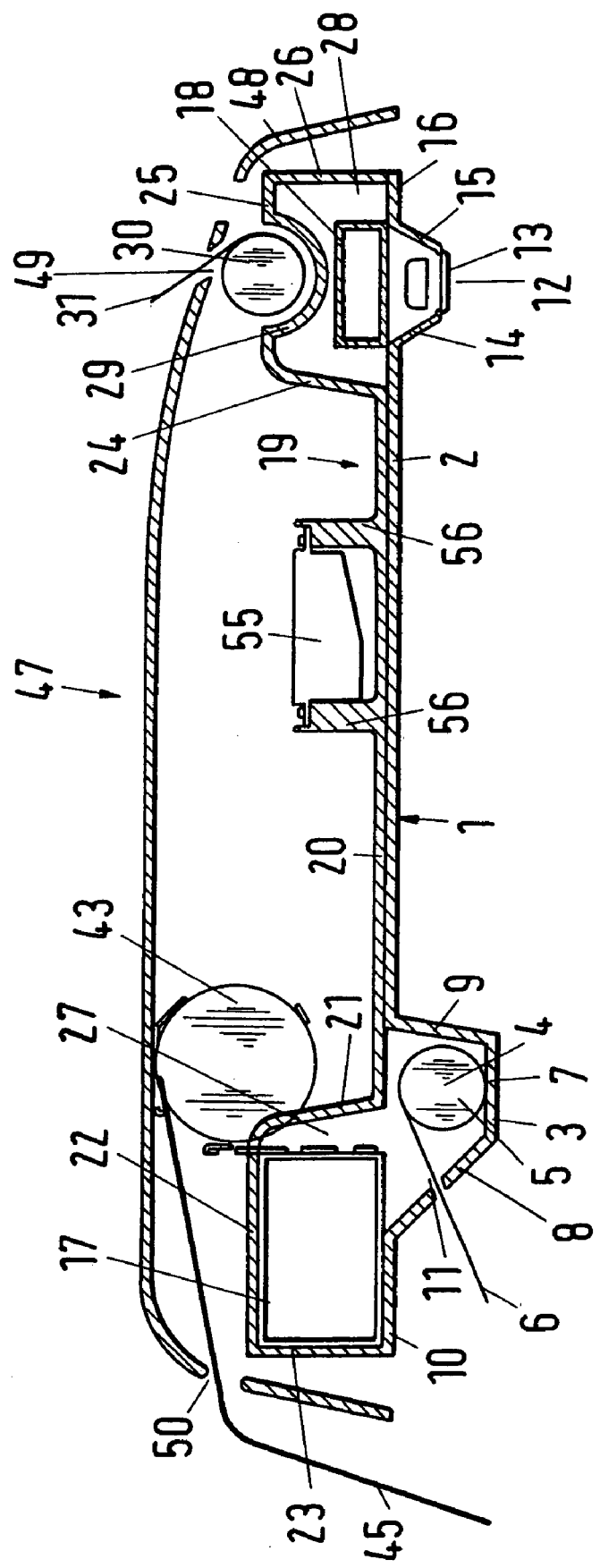

On the edge section 10 of the support 1 lies a hollow section part 17, which has a rectangular cross section and is for example an aluminum tube, which optimally reinforces the entire rack module. As FIG. 4 shows, the hollow section part 17 projects partially over the depression 3. On the opposite longitudinal side the support 1 is reinforced by an additional hollow section part 18, which preferably is likewise an aluminum tube. The hollow section part 18 has a rectangular cross section and lies on the support 1 in such a way that it covers the depressions 12.

A second dish-like support 19 is fastened to the support 1. Like the support 1, it may likewise be of metal material, but may alternatively be made of an appropriate dimensionally stable synthetic material. The support 19 has a flat central part 20, which rests on the central part 2 of the support 1 and is firmly joined to it. In this way, the rack module obtains outstanding rigidity and torsional strength.

The central part 20 extends to over the depression 3 and is converted in approximately half the width of the depression into a side wall 21, directed obliquely upward, which connects the central part 20 with an edge section 22 running parallel to the edge section 10 of the support 1. It advantageously lies on the hollow section part 17. The edge section 20 is turned perpendicular into an end wall 23, which extends to the edge section 10 of the support 1 and advantageously rests on the hollow section part 17 by its one narrow side. The hollow section part 17 is surrounded and protected by the two supports 1, 19 in the manner described. The hollow section part 17 lies over the major part of its periphery on the edge section 10 of the support 1 as well as on the end wall 23 and the edge section 22 of the support 19.

The support 19 is provided on the opposite longitudinal edge with a side wall 24, which adjoins the central part 20 at an obtuse angle and is converted into an edge section 25, lying parallel to the edge section 16, which adjoins, at right angles, an end wall 26, which extends to the free edge of the edge section 16 of the support 1. The edge section 25 advantageously lies at the same height as the edge section 22. Depending upon the design and components used in the rack module, the two edge sections 22, 25 may alternatively lie at unlike heights. The edge section 25 lies at a distance above the hollow section part 18. The side wall 24 and the end wall 26 lie at a distance from the hollow section part 18, which thus lies protected between the two supports 1 and 19.

As FIG. 4 shows, the side walls 21, 24 diverge out from the central part 20. The end walls 23, 26 lie parallel to each other and in each instance adjoin, perpendicularly, the free edge of the edge section 10, 16 of the support 1.

At their longitudinal edges, the two supports 1, 19 limit cavities 27, 28, in which the hollow section parts 17, 18 may be safely accommodated. The cavity 27 is connected over its length with the depression 3. The depressions 12 on the opposite longitudinal edge of the rack module are separated by the hollow section part 18 from the cavity 28.

The edge section 25 has in half its width a depression 29, semicircular in cross section, into which projects a take-up shaft 30 for a sunshade roller blind or the like. As FIGS. 2 and 3 show, the take-up shaft 30 with the sunshade roller blind 31 extends over virtually the entire length of the edge section 25.

Figure 2:
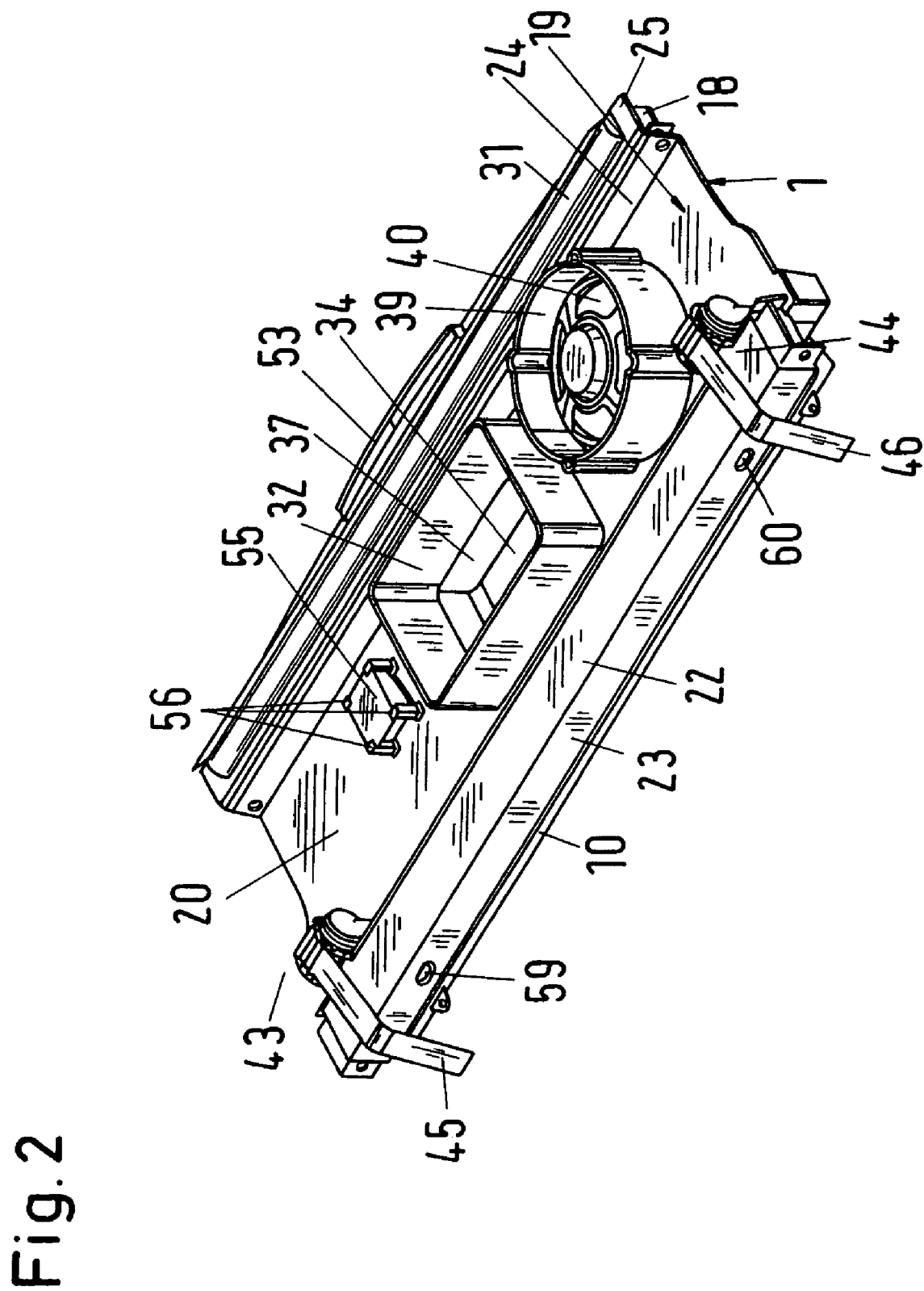
Figure 3:
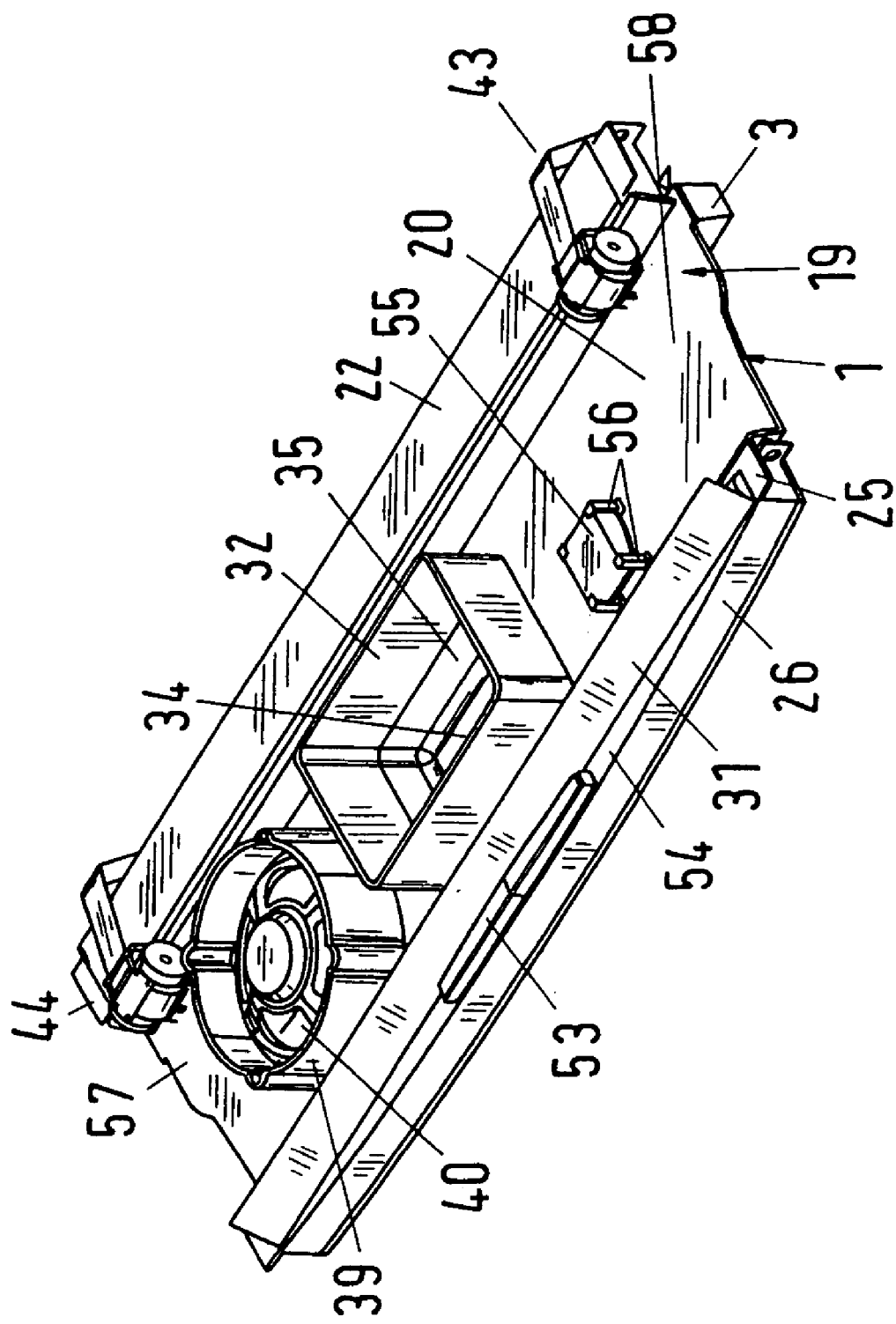
Figure 5:
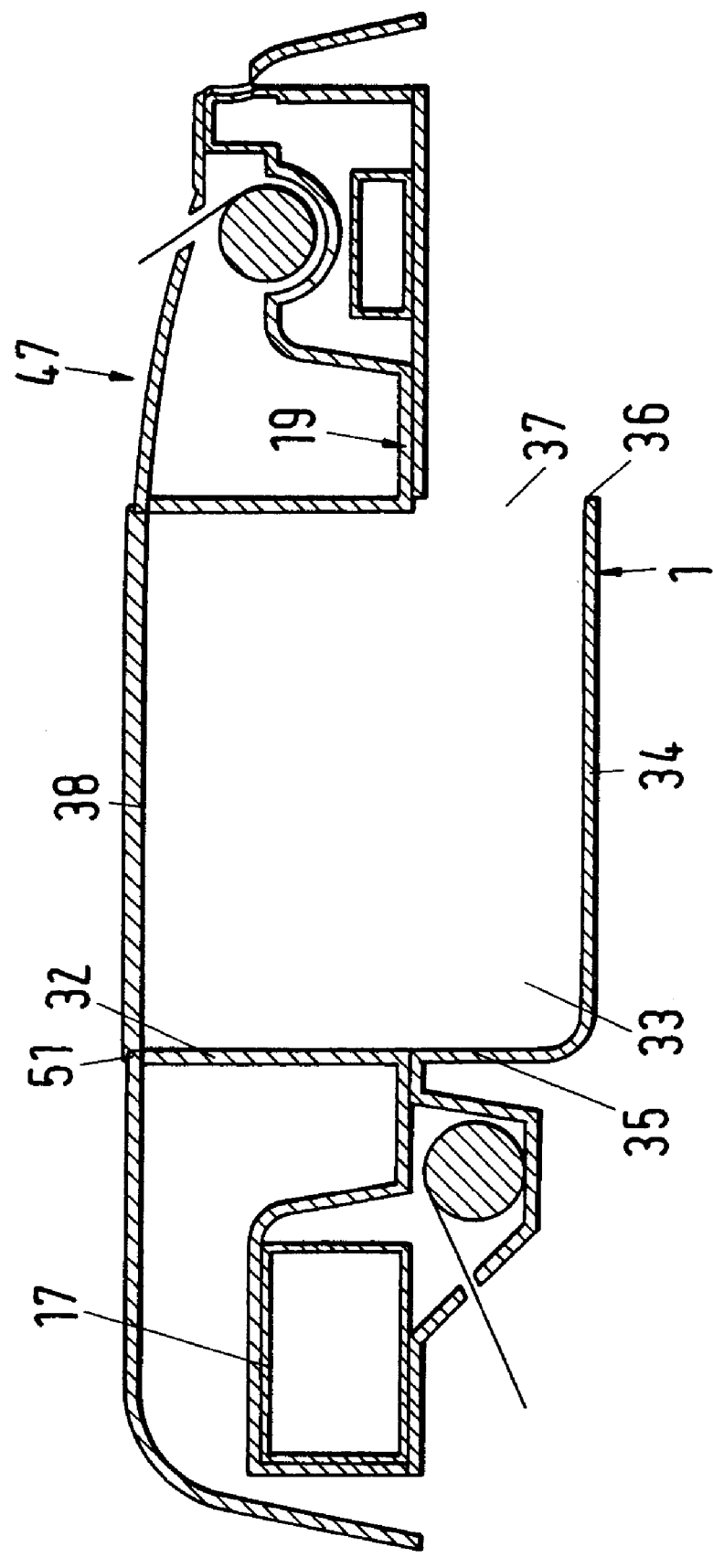

The central part 20 has in approximately half its length and width a ring wall 32, which advantageously is designed in one piece with the central part and has a rectangular contour (FIGS. 1 to 3). The ring wall 32 has a constant height over its periphery. The central part 2 of the support 1 is provided in the region of the ring wall 32 provided with a corresponding depression 33 (FIG. 5), whose floor 34 is flat and runs parallel to the central part 2. The floor 34 has a rectangular contour. On one longitudinal side and on the two narrow sides, a side wall 35, by which the floor 34 is connected with the central part 2 of the support 1, adjoins the floor 34. No side wall adjoins the edge 36 of the floor 34 turned toward the depressions 12, so that a rectangular opening 37 is formed on this side (FIGS. 2 and 5). The depression 33, which is limited by the floor 34 and the three side walls 35, forms a storage space, which is accessible from the trunk of the vehicle via the opening 37. The depression 33 is in addition accessible from above. The side walls 35 of the depression 33 lie flush with the corresponding sections of the ring wall 32. Thus, objects may be placed in the storage space 33 from above as well as from the trunk.

It is in addition possible to insert a drawer or the like, for example, into the depression 33 through the opening 37, which can then be secured in suitable fashion.

As FIG. 5 shows, a cover 38, which may be held for example by latching, may be placed on the ring wall 32. The cover 38 may if necessary simply be removed in order to gain access to the rack 33. The side walls 35 and the floor 34 advantageously are designed in one piece with the support 1. The ring wall 32 advantageously is also designed in one piece with the support 19.

Figure 6:
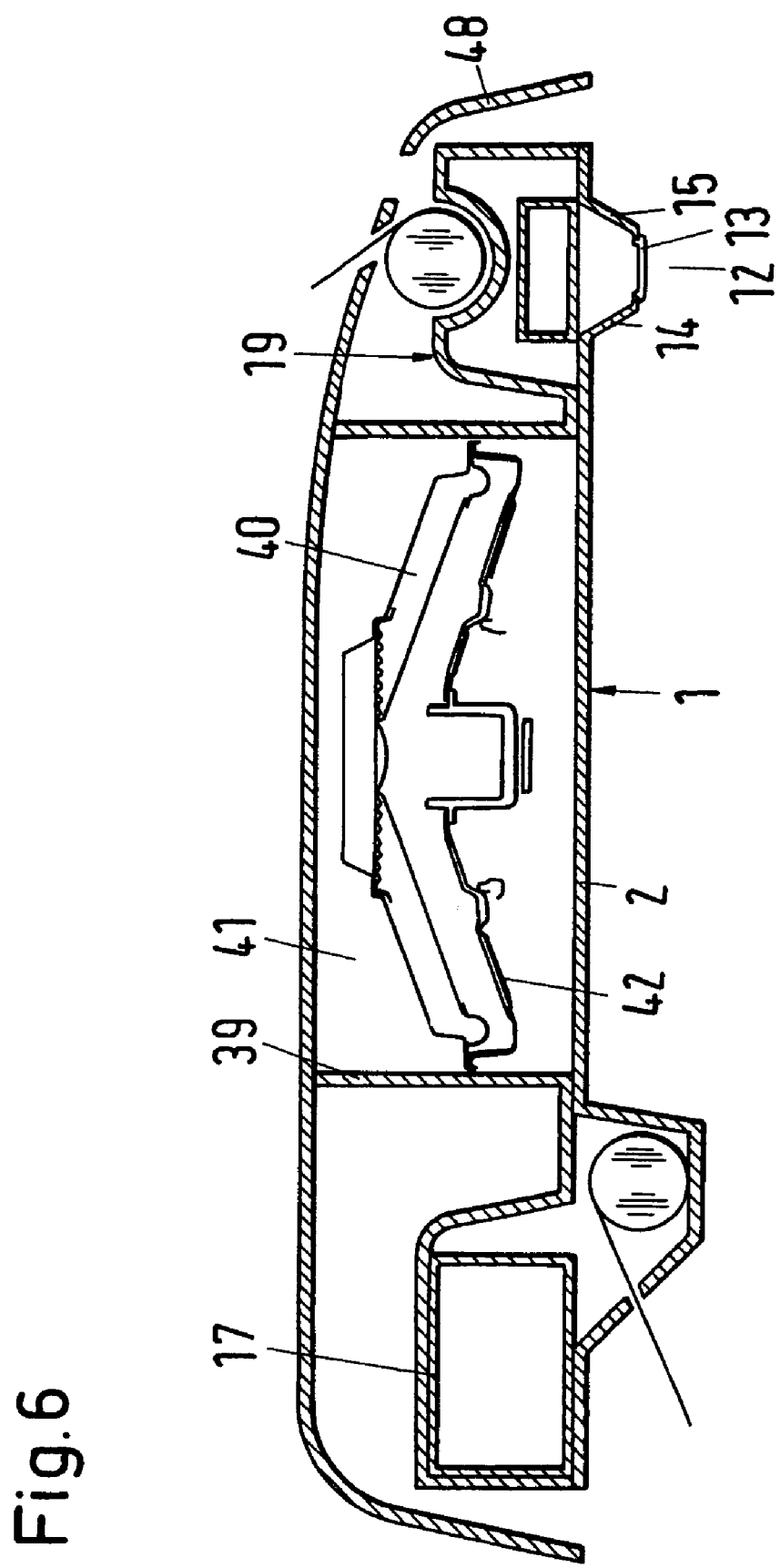

In the region beside the ring wall 32 is found a mounting ring 39 for a loudspeaker 40. The mounting ring 39 advantageously is designed in one piece with the central part 20 of the support 19. As FIG. 6 shows, the mounting space 41 surrounded by the cylindrical mounting ring 39 is limited by a part of the central part 2 of the support 1. In the exemplary embodiment, the mounting ring 39 has the same height as the ring wall 32. It is of course possible to design the mounting ring 39 and the ring wall 32 unlike in height.

The loudspeaker 40 lies sunk in a depression and hence protected in the mounting space 41. The loudspeaker membrane 42 is turned toward the central part 2 of the support 1. As FIG. 6 shows, the loudspeaker 40 is at a distance from the central part 2 of the support. The ring wall 39 is adapted to the diameter of the loudspeaker 40, which is held on the mounting ring 39 in known fashion.

The mounting ring 39 lies in half the width of the support 1, 19 (FIG. 2). In addition, it is located in the region between the ring wall 32 and one narrow side of the support 1, 19 (FIGS. 2 and 3). The ring wall 32 advantageously lies in half the width and in half the length of the rack.

The ring wall 32 and the mounting ring 39 lie in the region between the two take-up shafts 5, 30 lying parallel to each other, which are provided near the longitudinal sides of the rack.

To the support 19, in the region above the take-up shaft 5 and adjacent to the narrow sides of the rack, are fastened two belt roll-ups 43, 44, which are designed in known fashion and serve for securing the persons sitting on the rear seat of the vehicle. The safety belt 45, 46 is guided via the end wall 23 to the rear seat of the motor vehicle. Depending upon how the module is equipped, the belt roll-ups 43, 44 may alternatively be omitted.

The rack may be covered with a covering 47, which is set on the rack. The covering 47 is designed hood-like and is provided with a surrounding pulled-down edge 48. The covering 47 is provided with a slot 49 for passage of the sunshade roller blind 31 (FIG. 4). On the opposite longitudinal side of the rack the covering 47 has two slots 50 for passage of the safety belts 45, 46. Differing from the exemplary embodiment represented, the module may alternatively have three or four belt roll-ups. Then the covering 47 has three or four slots 50 for passage of the corresponding safety belts. The covering 47 is provided in the region above the ring wall 32 with an opening 51 (FIG. 5), which has the same contour as the ring wall 32 and is closed by the cover 38.

The edge 48 of the covering 47 runs obliquely over the periphery and reaches all the way to the level of the support 1. The supports 1, 9 are completely covered and hence protected by the covering 47.

The covering 47 is provided at the level of the end wall 26 with a rectangular opening 52 (FIG. 1), through which projects an elevated brake light 53, which is located on the edge section 25 of the support 19. The brake light 53 is provided in half the length of the edge section. So that the brake light 53 can be fastened to the edge section 25 without any difficulty, its free edge 54, as FIG. 3 shows, is designed running arched. Therefore, the edge section 25 has its greatest width in half the length. The edge section 25 is widened only so that the brake light 53 can be mounted directly beside the sunshade roller blind 31.

In the region beside the brake light 53 are found, at the edge section 25, vents 61, 62 (FIGS. 1 and 7), which ensure communication between the vehicle interior and the trunk for pressure equalization.

On the side of the ring wall 32 turned away from the mounting ring 39, an electrical component 55 is fastened to the central part 20 of the support 19 (FIGS. 2 and 3). It is fastened to four columns 56 standing up perpendicular from the central part 20. These advantageously are designed in one piece with the central part 20 of the support (FIG. 4) and have an essentially flat face, to which the electrical component 55 is fastened on with plates. This electrical component 55 is provided near the sunshade roller blind 31.

In the region between the loudspeaker mounting ring 39 and the adjacent narrow side as well as in the region between the ring wall 32 and the adjacent narrow side of the rack, there are provided free spaces 57, 58 (FIG. 3), in which additional components may if necessary be accommodated, such as for example additional loudspeakers, a socket and the like.

Illuminating means which cast light downward into the trunk of the vehicle may for example be accommodated in the depressions 12 of the support 1. In this case, the floor 13 of the depressions 12 consists of material permeable to light. Instead of the floor 13, the depressions 12 may be open downward, so that the light emitted by the illuminating means is cast downward unhindered into the trunk. The floor 13 may consist of synthetic material permeable to light, which may in addition be provided with optical elements. Advantageously, the floor 13 of the depressions 12 is provided detachable, so that it can be removed, for example for replacing the illuminating means. In this case, the floor 13 advantageously is designed as a clip-on element.

The two supports 1, 9, lying on each other and firmly joined together, impart high strength and stability to the rack. The fact that the supports 1,19 are not designed flat, but are designed dish-like and have regions protruding from the plane likewise contributes to this. These regions serve not only for reinforcing and strengthening the rack, but likewise serve in the manner described for the accommodation of a variety of functional parts.

The supports 1, 19 are adapted to the maximum number of functional parts to be incorporated. Since the rack has the covering 47, it is not disturbing when some of the mounting spaces of the rack are not occupied. The covering 47 advantageously is provided detachable. The covering 47 may consist of any suitable material. The hollow section parts 17, 18 impart great strength to the rack. The hollow section parts 17, 18, lying parallel to each other and provided on the longitudinal sides of the rack, are accommodated protected in the cavities 27, 28, which cover the hollow section parts at least from above.

The rack serves for storage of the belt roll-ups 43, 44, and thus has correspondingly great strength. As a result, additional mounting points in the motor vehicle are unnecessary. The baggage net 6 wound up on the shaft 5 is pulled out when the backrest of the rear seat in the vehicle is folded down. The net 6 then advantageously acts as a crash safety device.

Because of the great strength of the rack, it is possible to bolt the foldable backrest of the rear seat to the rack. For this purpose, the rack may be provided with suitable fastening apertures 59, 60 (FIGS. 1 and 2) in the end wall 23 of the support 19. Bolting of the backrest is effected in the hollow section part 17, so that the backrest can be reliably secured.

The two supports 1, 19 advantageously consist of high-strength glass fiber-reinforced polypropylene. The supports 1, 19 may be provided with a honeycomb or rib structure. The rib structure may be provided in such a way that it permits tight-fit insertion of the reinforcing components 17, 18, which consist of metal, preferably of aluminum. Additional reinforcing parts may be provided in the module. After all components 17, 18 required for the stability of the module have been put in place, the two supports 1 and 19 are welded together, for example by butt welding, so that the complete honeycomb structure is produced.

After this fabrication operation, the module is fitted with the appropriate components. The wiring may also be provided at this time. The covering 47 may then likewise be mounted on the module. It is a complete unit, which is supplied to the automobile manufacturer as a complete part. The electrical functions of the components are tested before delivery. The automobile manufacturer need only install the module in the vehicle. This may be done for example by a robot, by which the module is inserted into the vehicle at the installation site. Then the worker need only fasten the module in the vehicle in suitable fashion, by for example bolting or for example latching.

As a result of the module design described, the fabrication time for assembly of components on the hat rack is considerably reduced. Delivery of variant modules to the automobile manufacturer is possible. Since the individual components are installed in the module outside the vehicle, minimized fabrication costs are ensured.

FIGS. 9 to 17 show a rack in which the two supports 1, 19 are designed in one piece with each other. Accordingly, these two parts need no longer be joined together separately. This permits low-cost production of such a rack. The two supports designed in one piece with each other form the basic support 1A, which, up to the one-piece design, is designed like the two supports 1, 19 joined together of the preceding embodiment. As in the preceding exemplary embodiment, the rack serves as a mounting position for the two belt roll-ups 43, 44. In this embodiment as well, additional mounting points in the motor vehicle are therefore unnecessary.

The support 1A has the two cavities 27, 28, in which the hollow section parts 17, 18 are accommodated.

The support 1A has, in half its length and width, the rectangular ring wall 32, which advantageously is designed in one piece with the support 1A. Corresponding to the preceding embodiment, the ring wall 32 advantageously has an approximately constant height over its periphery. In the region of the ring wall 32 the support 1A is provided with the depression 33 (FIG. 13), which has the flat floor 34, which runs parallel to the central part of the support 1A and has a rectangular contour. One longitudinal side and the two narrow sides of the floor 34 adjoin the side wall 35, with which the floor 34 is connected with the central part 2 of the support 1A. A drawer 63 (FIG. 16), which is guided and held in suitable fashion, is inserted in the open side turned toward the cavity 28. The drawer 63 can be conveniently pulled out and pushed in with a handle 64. The ring wall 32 is closed by the cover 38, which in the exemplary embodiment is designed in one piece with the ring wall 32. The cover 38 may of course alternatively be held detachable on the ring wall 32, for example by latching, so that if necessary it can be removed in order to gain access to the rack 33. The side walls 35 and the floor 34 advantageously are designed in one piece with the support 1A.

Corresponding to the preceding embodiment, the rack is covered by the covering 47, which is set on the rack and is designed hood-like. The covering 47 has the surrounding pulled-down edge 48. Corresponding to the preceding exemplary embodiment, the covering 47 is fastened, preferably detachable, to the support 1A in suitable fashion.

The rack of FIGS. 9 to 17 is otherwise designed the same as the preceding exemplary embodiment and has the same advantages that have been described in connection with the preceding embodiment.

Figure 20:
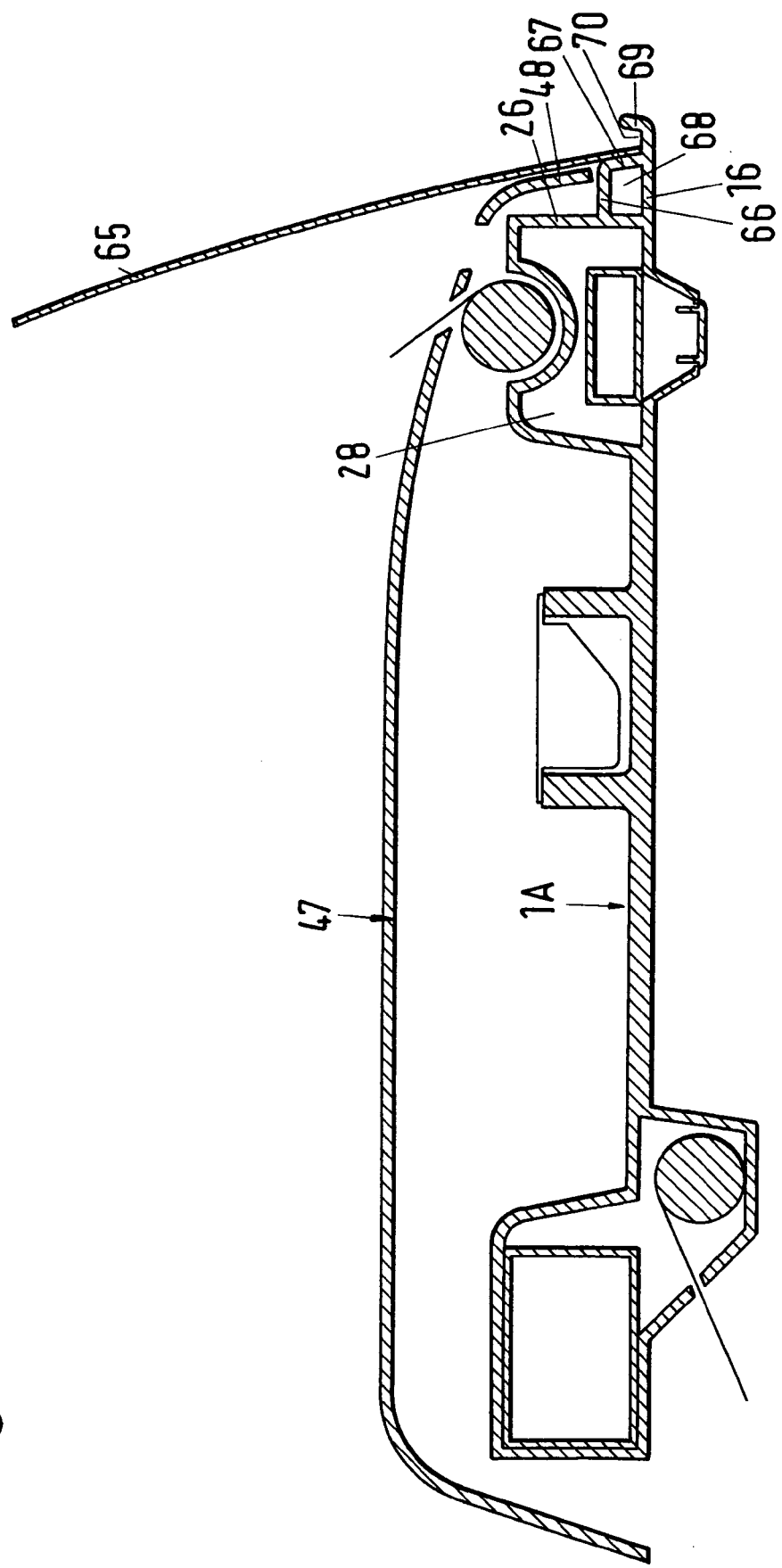
Figure 21:
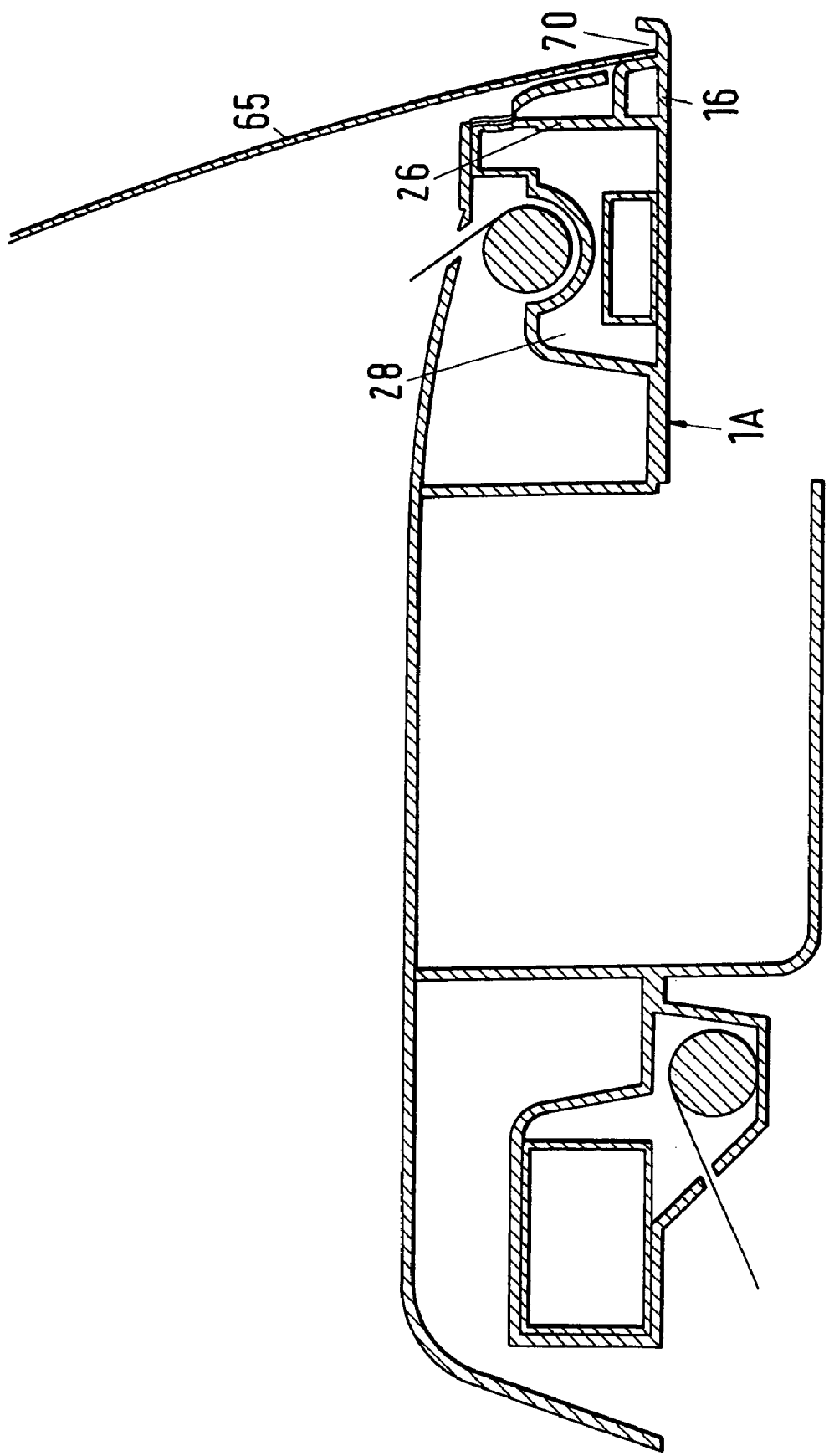
Figure 22:
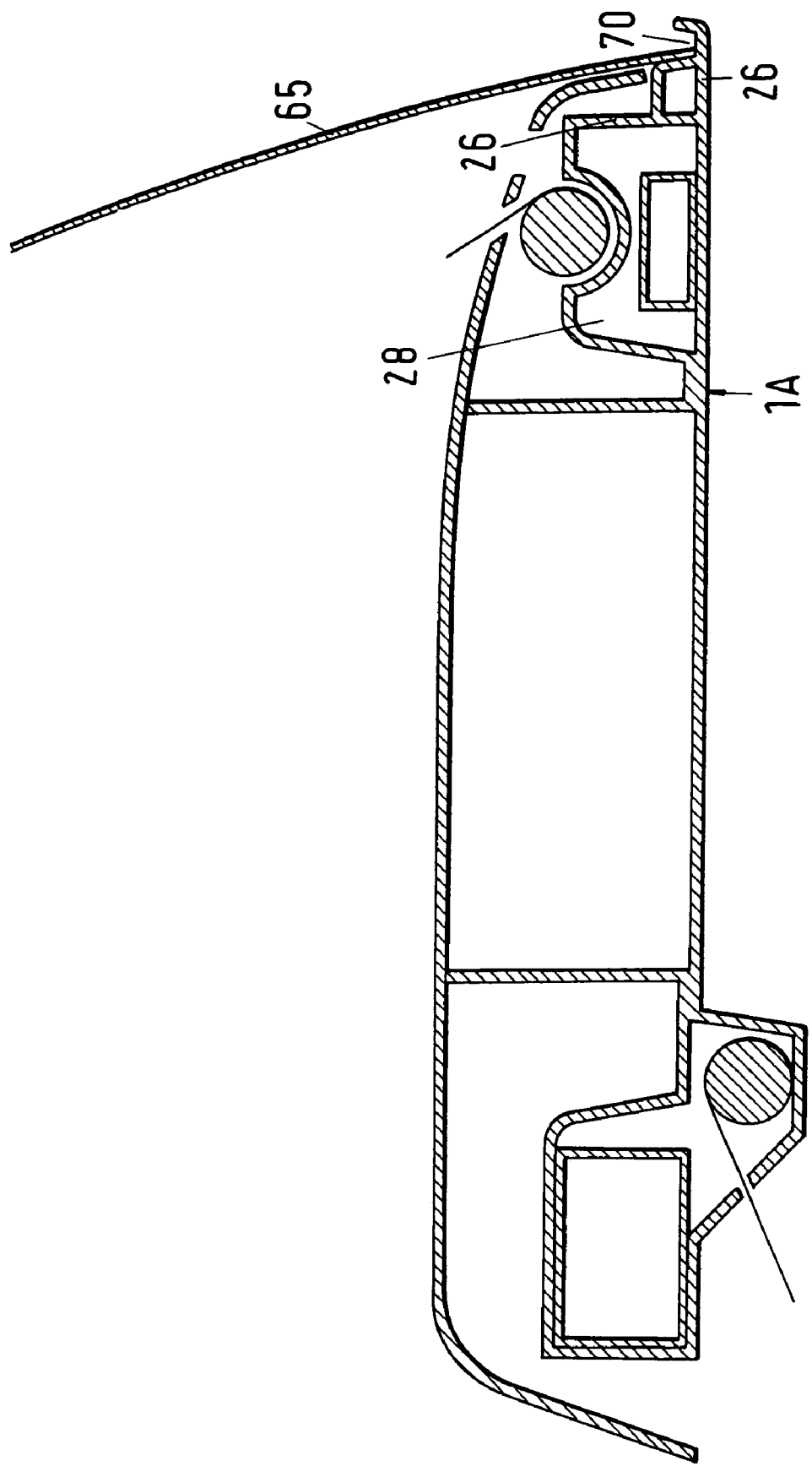

The embodiment of FIGS. 18 to 22 corresponds substantially to the exemplary embodiment of FIGS. 9 to 17. In this rack again, the two supports 1, 19 of the embodiment according to FIGS. 1 to 8 are designed in one piece with each other, so that the one-piece support 1A is formed corresponding to the embodiment of FIGS. 9 to 17. The belt roll-ups 43, 44 are fastened to the support 1A, so that corresponding mounting points in the motor vehicle are unnecessary. The rack has the strength that is legally required for mounting points in motor vehicles for belt roll-ups. In contrast to the two preceding exemplary embodiments, the rack serves for accommodation of the rear window 65 of the motor vehicle. The edge section 16 of the support 1A is elongated beyond the end wall 26 of the cavity 28 (FIGS. 20 to 22). In this elongated edge section 16 a transverse wall 66, which is converted at an obtuse angle into the end wall 67 of a cavity 68, projects from the end wall 26 of the cavity 28. The end wall 67 connects the transverse wall 66 with the edge section 16. The cavity 68 advantageously extends over the full length of the rack. The rack is strengthened in the region of this longitudinal edge by the cavity 66. The pulled-down edge 48 of the covering 47 may be fastened to the transverse wall 66. However, it is alternatively possible that the pulled-down edge 48 rests only on the transverse wall 66 or is even a slight distance from it. The transverse wall 66 and the end wall 67 advantageously are designed in one piece with the support 1A.

The end wall 67 lies oblique to the edge section 16. Its outer side may thus serve as a bearing surface for the lower edge of the rear window 65 of the motor vehicle. The end wall 67, together with an upward-angled edge 69 of the edge section 16, limits a channel 70 for insertion of the lower edge of the rear window 65. It may be held in the channel 70 in suitable fashion, for which conventional fastening methods may be used.

Otherwise the rack is designed the same as the preceding exemplary embodiment.

In an additional embodiment (not represented), it is possible to provide the insertion channel 70 as a separate element, which is present on the vehicle body side and to which the rack is attached upon installation in the motor vehicle. In this case, an appropriate connection as well as a seal between this separate channel element and the rack is required.

FIGS. 23 to 29 describe possibilities for how the rack can be installed in the motor vehicle in such a way that the forces acting on the rack can be effectively transmitted to the body of the motor vehicle.

Figure 23:
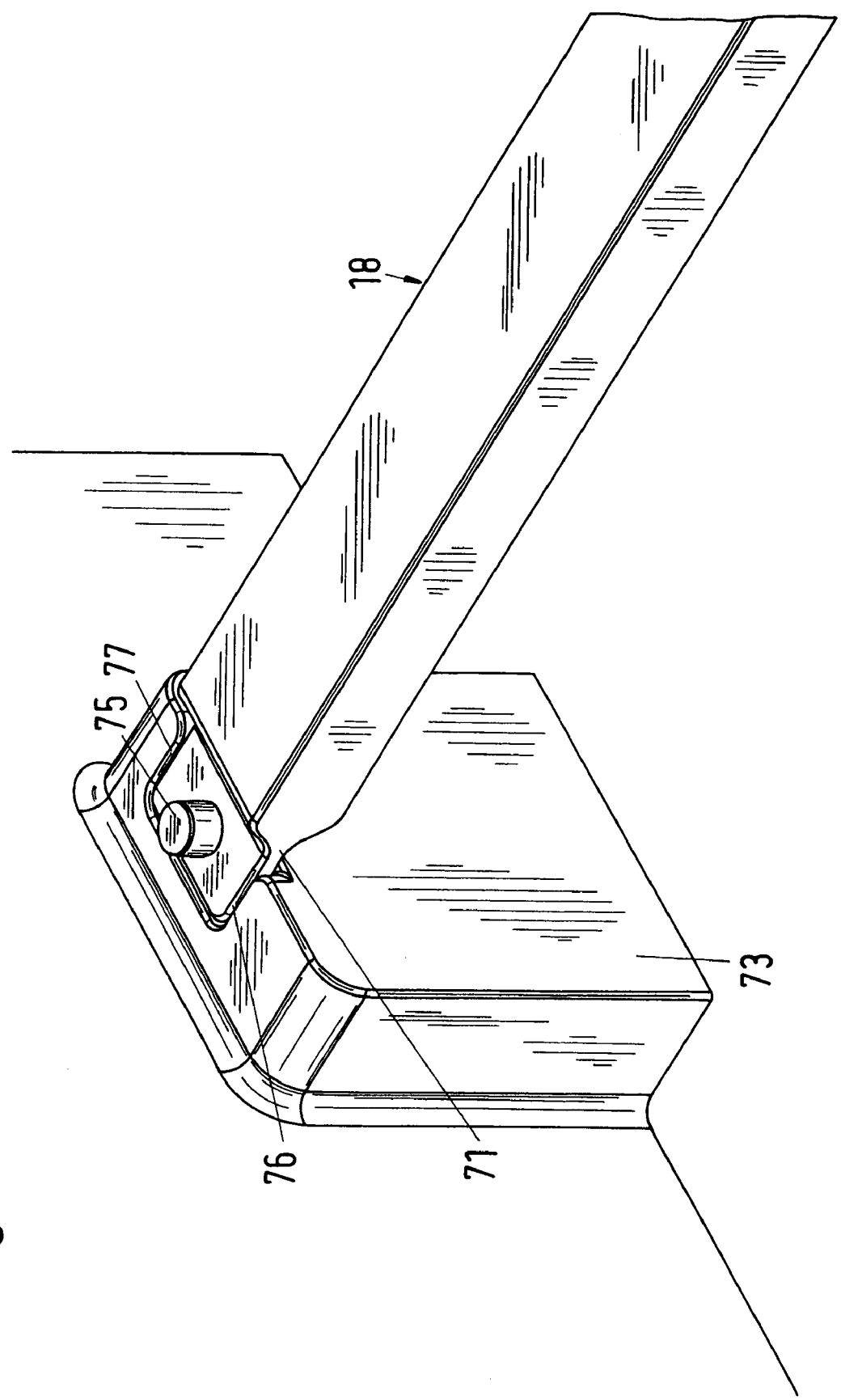
Figure 24:
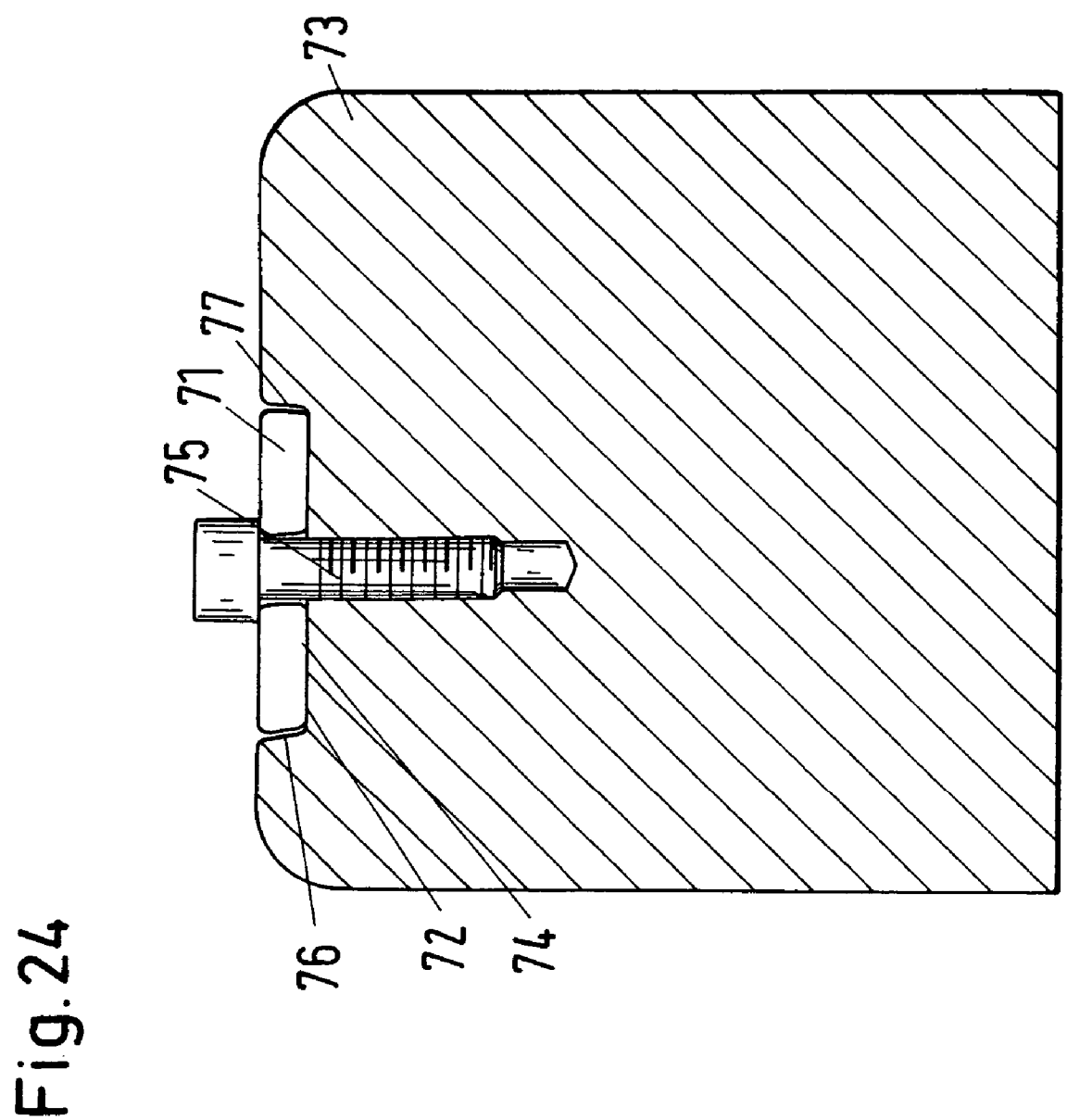
Figure 25:
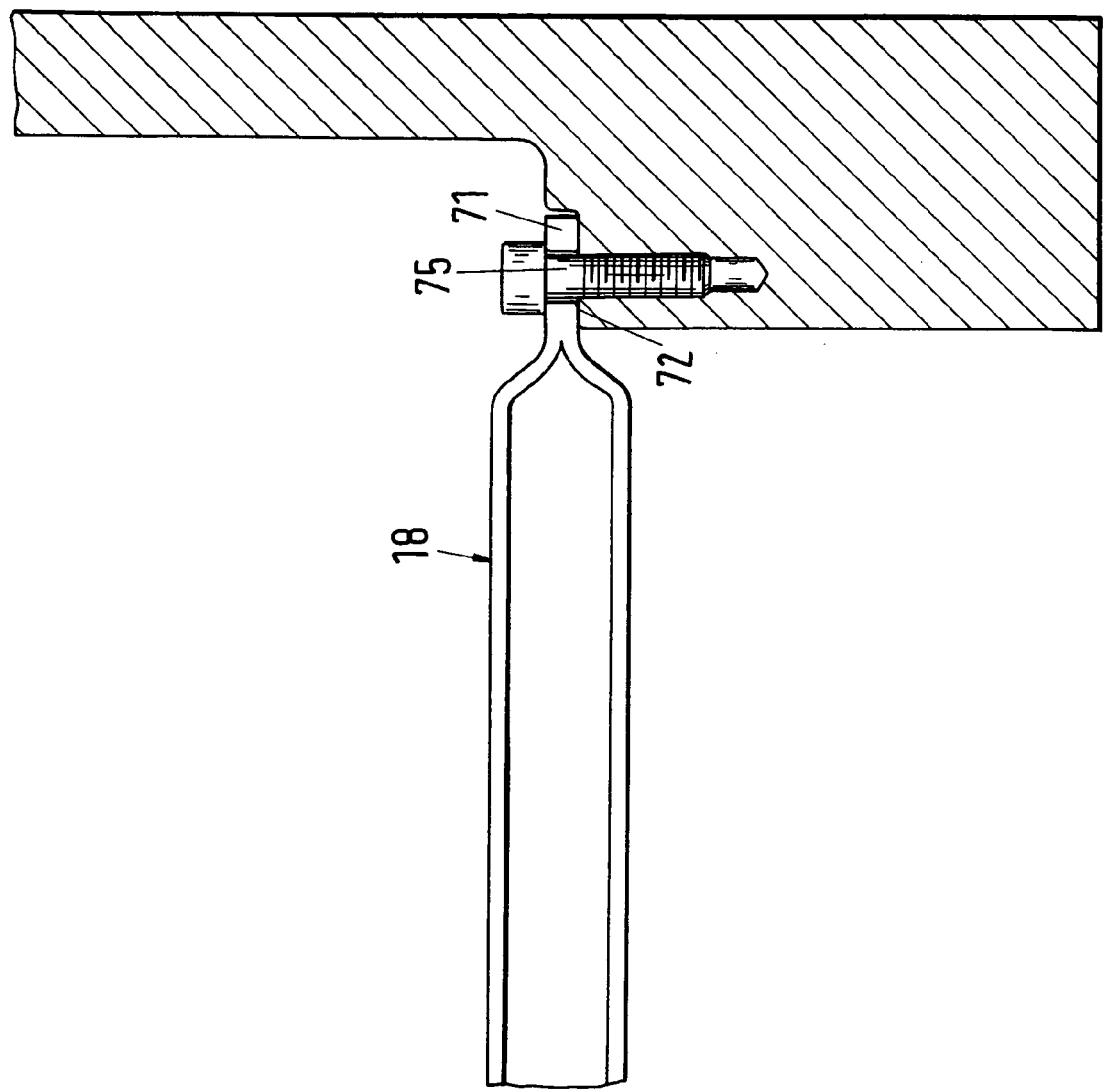
Figure 26:
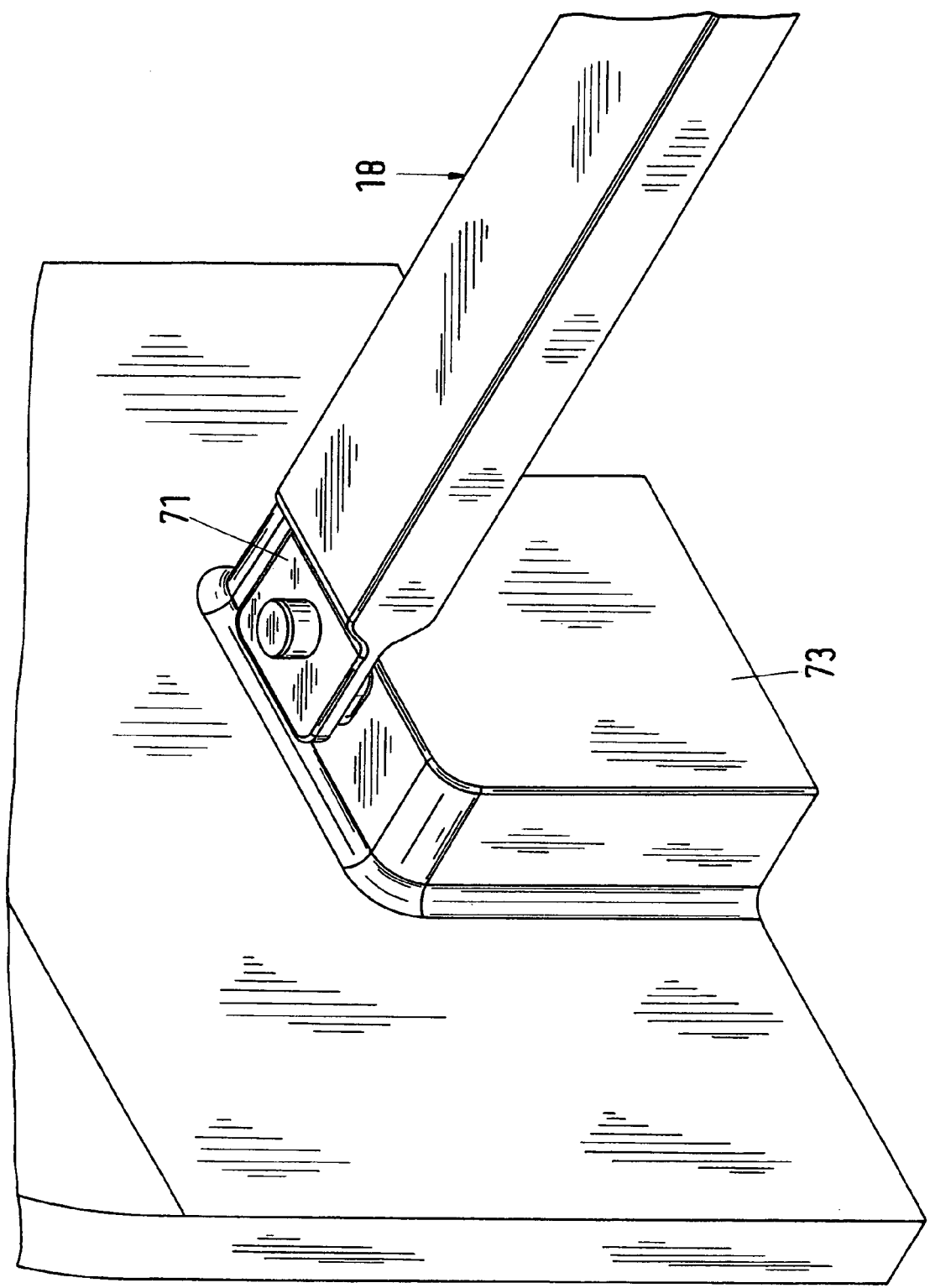
Figure 27:
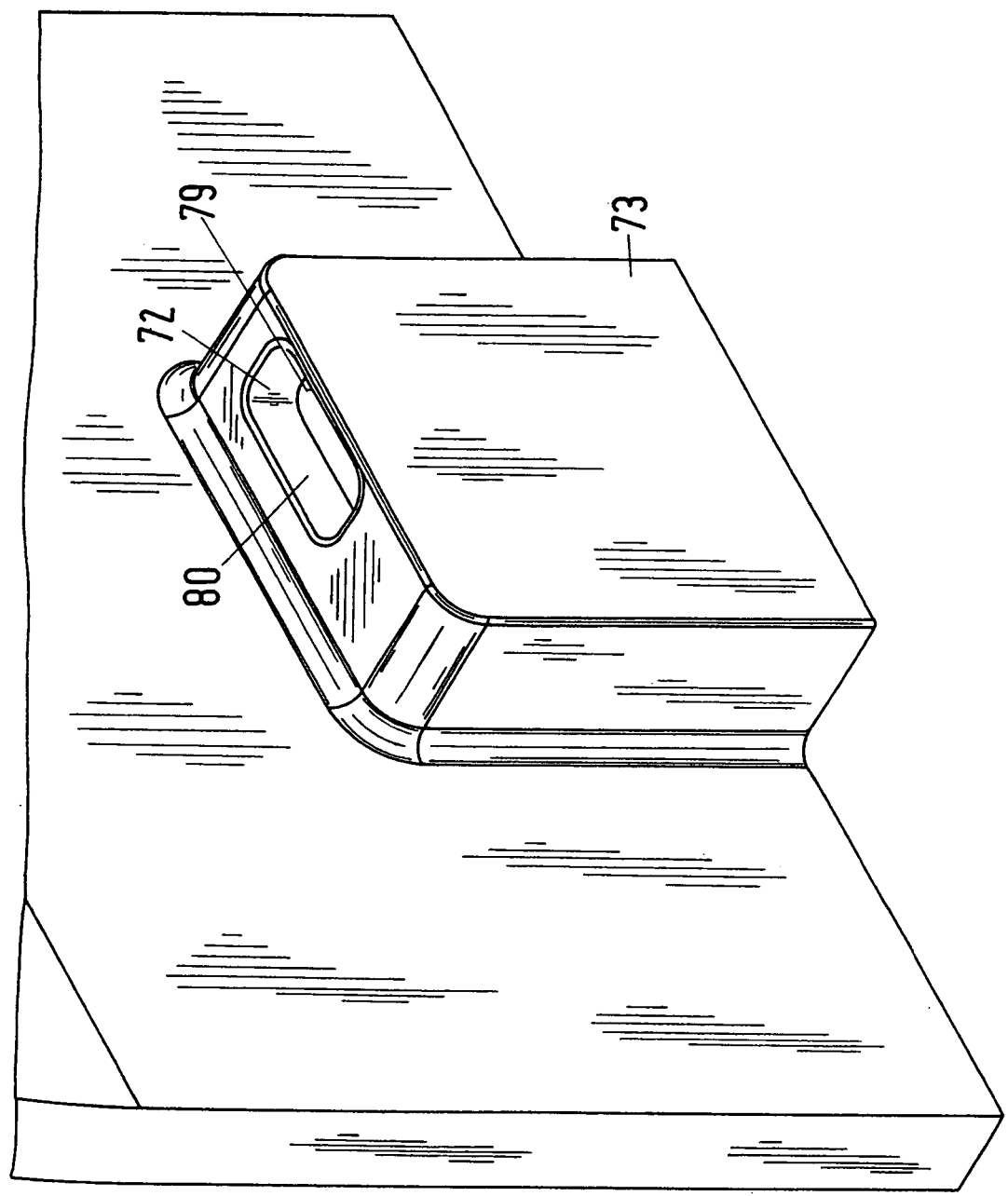
Figure 28:
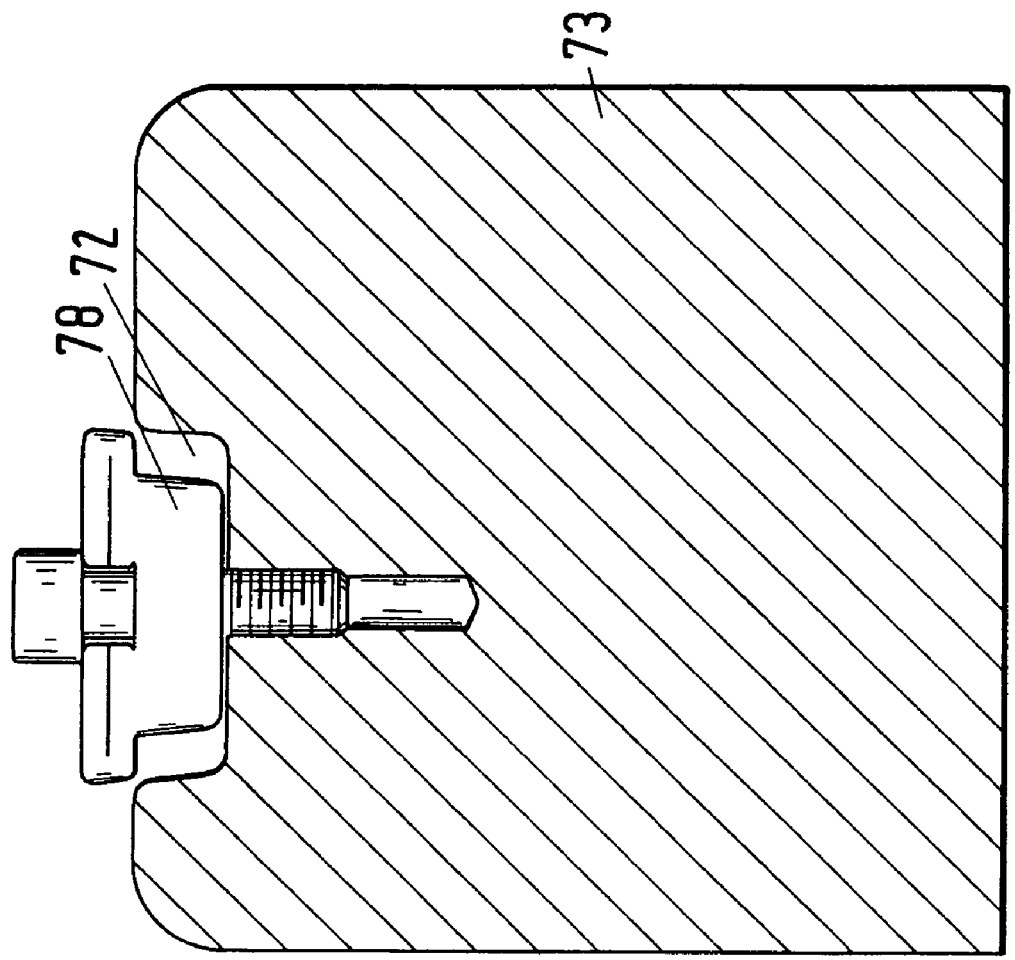

Both ends of the support 18 located in the cavity 28 project over the rack. One end 71 of the support 18 is represented in FIG. 23. The support end 71 is designed by pressing in the shape of a plate, which engages in a depression 72 of a body-side rack part 73. The depression 72 is open in the direction of the support 18 and has a flat floor 74, on which the support end 71 rests. The support end 71 is fastened to the rack part 73 by a bolt 75. The depth of the depression 72 corresponds to the thickness of the support end 71. Transverse to the longitudinal direction, the support 18 is secured against shifting by side walls 76, 77 of the depression 72. The support end 71 rests on the side walls 76, 77.

On the other side, not visible in FIG. 23, the body of the motor vehicle likewise has a rack part 73, to which the other support end is fastened in like fashion. The rack is firmly connected with the body of the motor vehicle in the manner described via the support 18. When the edge 48 of the covering 47 runs over the periphery of the support 1, 19; 1A, it is provided with a corresponding recess for passage of the support end 71. In the racks described, the covering 47 may alternatively be provided in such a way that the angled edge 48 is provided only along the two longitudinal sides of the rack. In this case, the covering 47 extends so far over the length of the rack that it is completely covered upward.

Figure 29:
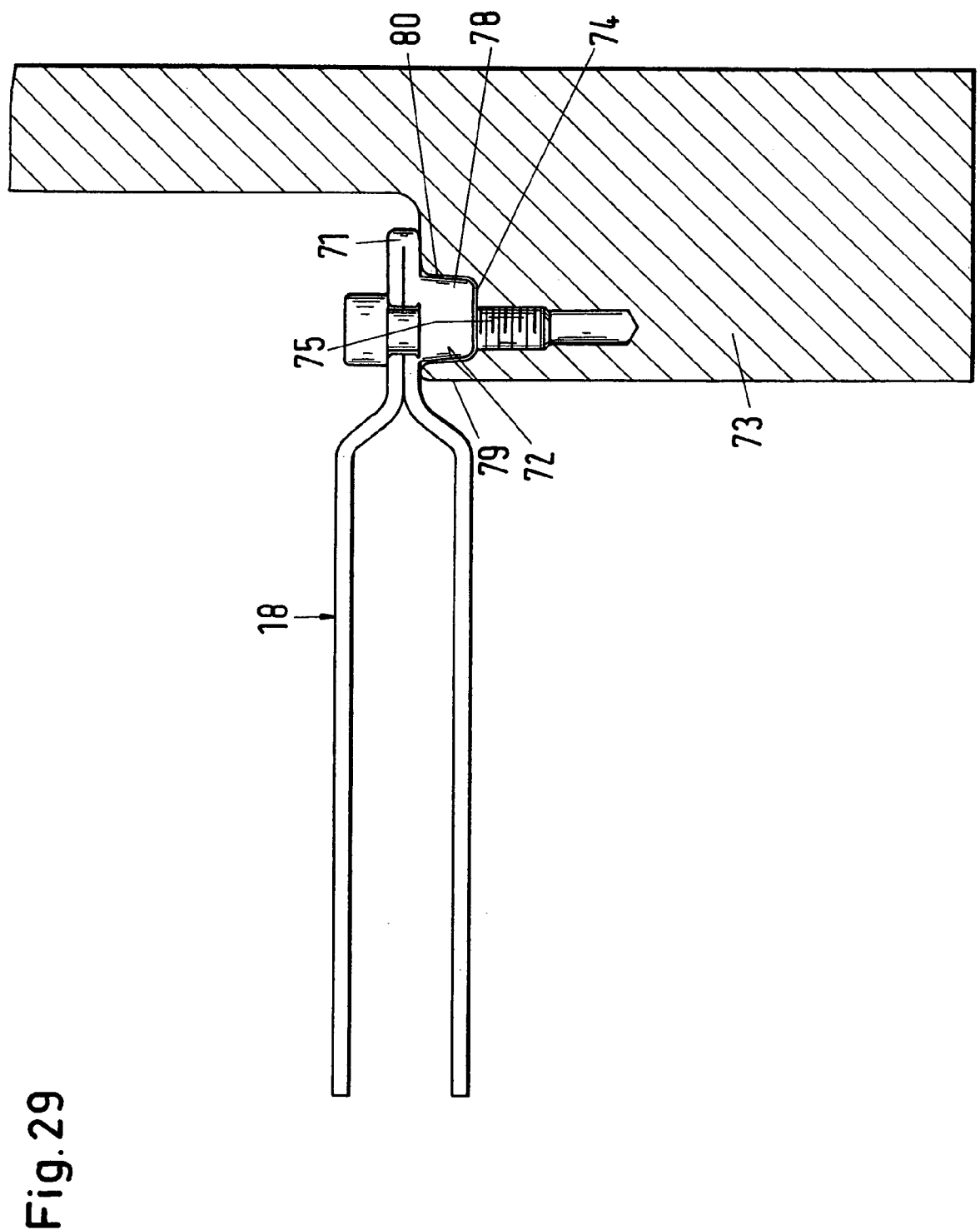

In the embodiment of FIGS. 26 to 29, the depression 72 in the body part 73 is closed all around. The end 71 of the hollow support 18 lies partly on the rack part 73. The support end 71 is plastically deformed in such a way that it has a projection 78, by which it engages in the depression 72. The projection 78 may alternatively be a separate part that is fastened, for example welded, to the squeezed-together support end 71. The projection 78 is designed in such a way that it rests on the side walls 79, 80 of the depression 72 lying transverse to the longitudinal direction of the hollow support 18 (FIG. 29). They converge in the direction of the flat floor 74 of the depression 72. The projection 78 has corresponding converging side walls 81, 82, which in the mounting position rest on the side walls 79, 80 of the depression 72. The support end 71 is fastened to the body-side rack part 73 by the bolt 75, which penetrates the projection 78.

The other end of the hollow support 18, not represented in FIGS. 26 to 29, is fastened to a body part in the same manner.

Figure 7:
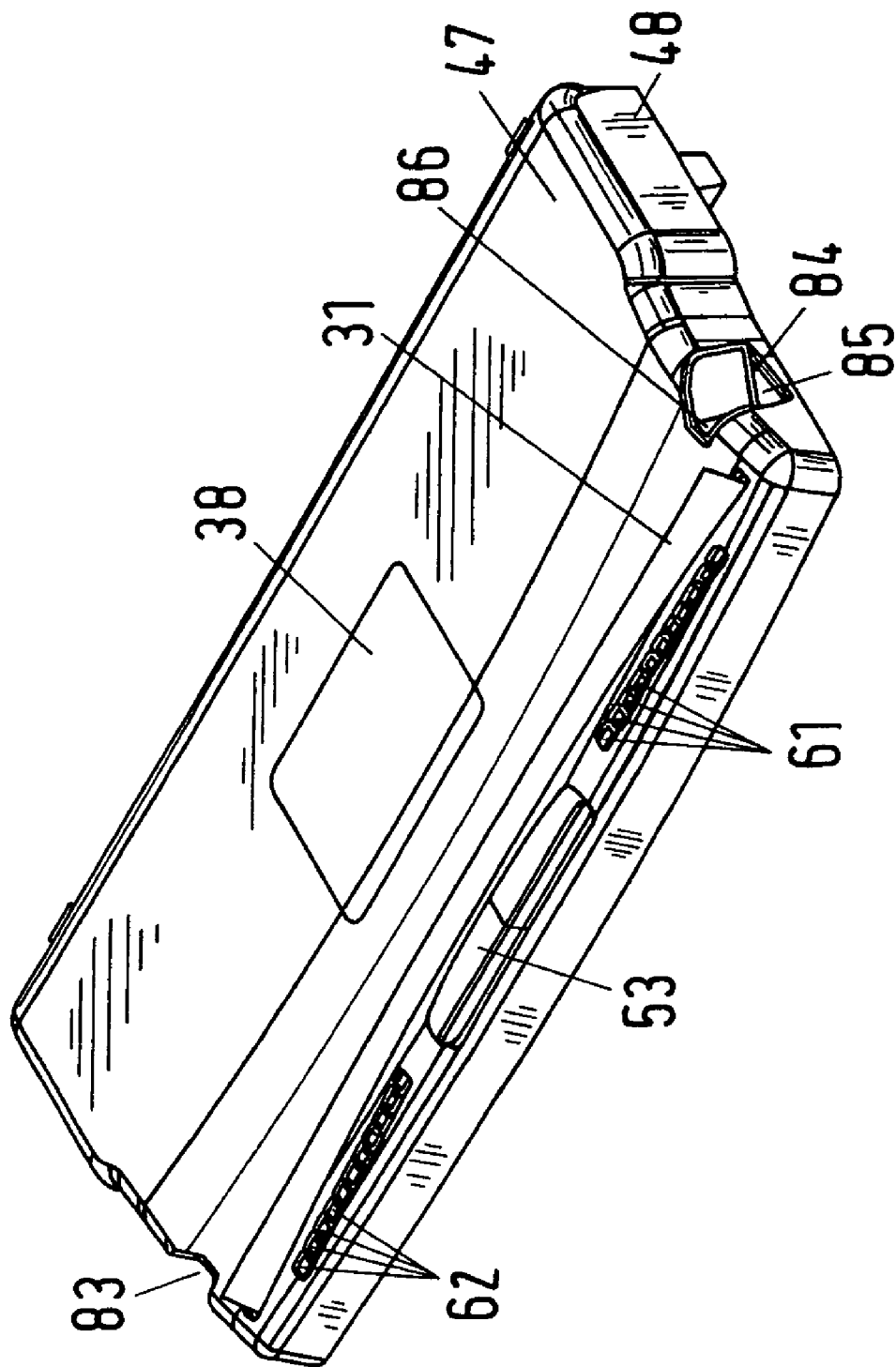
Figure 8:
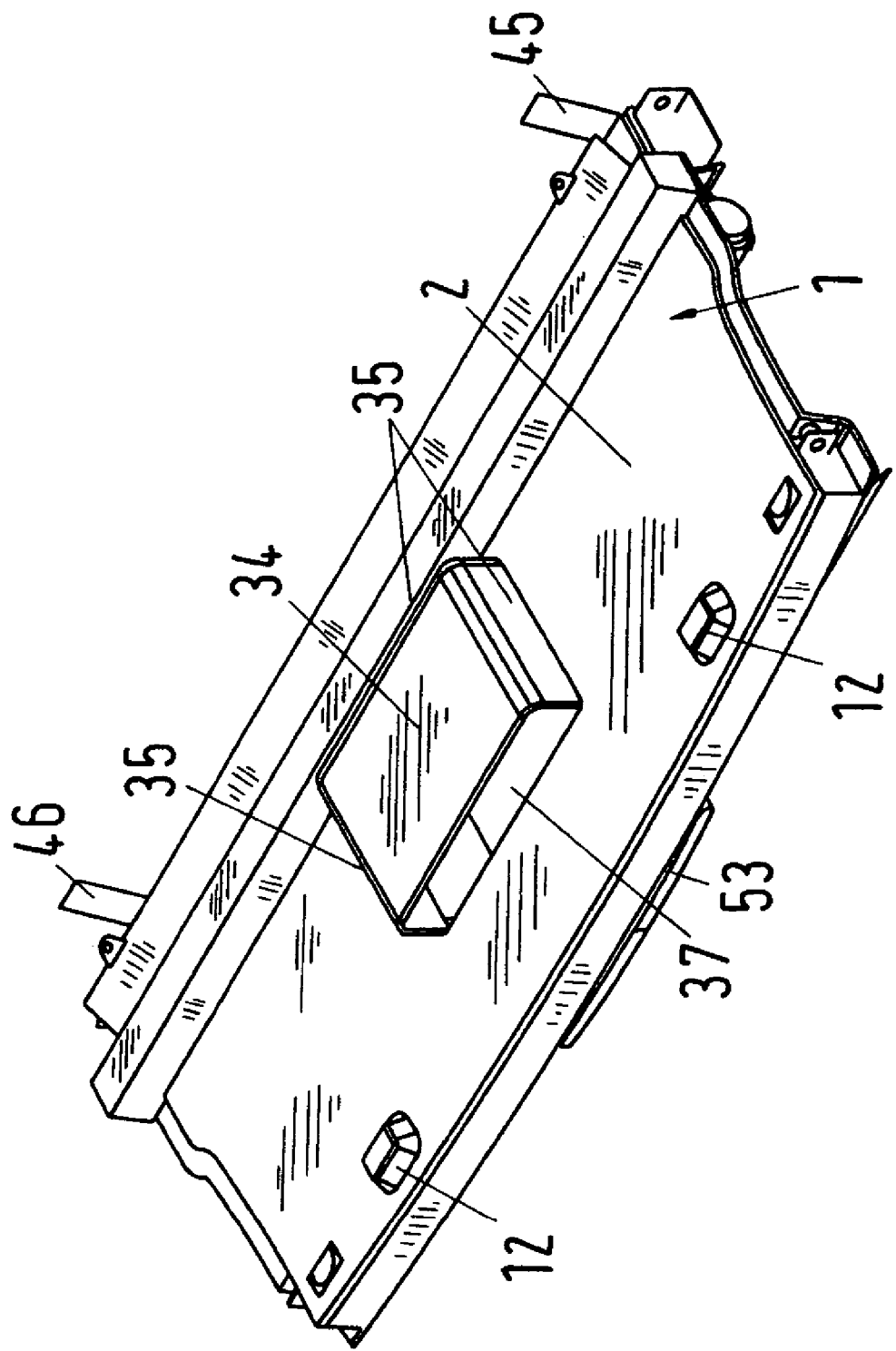
Figure 9:
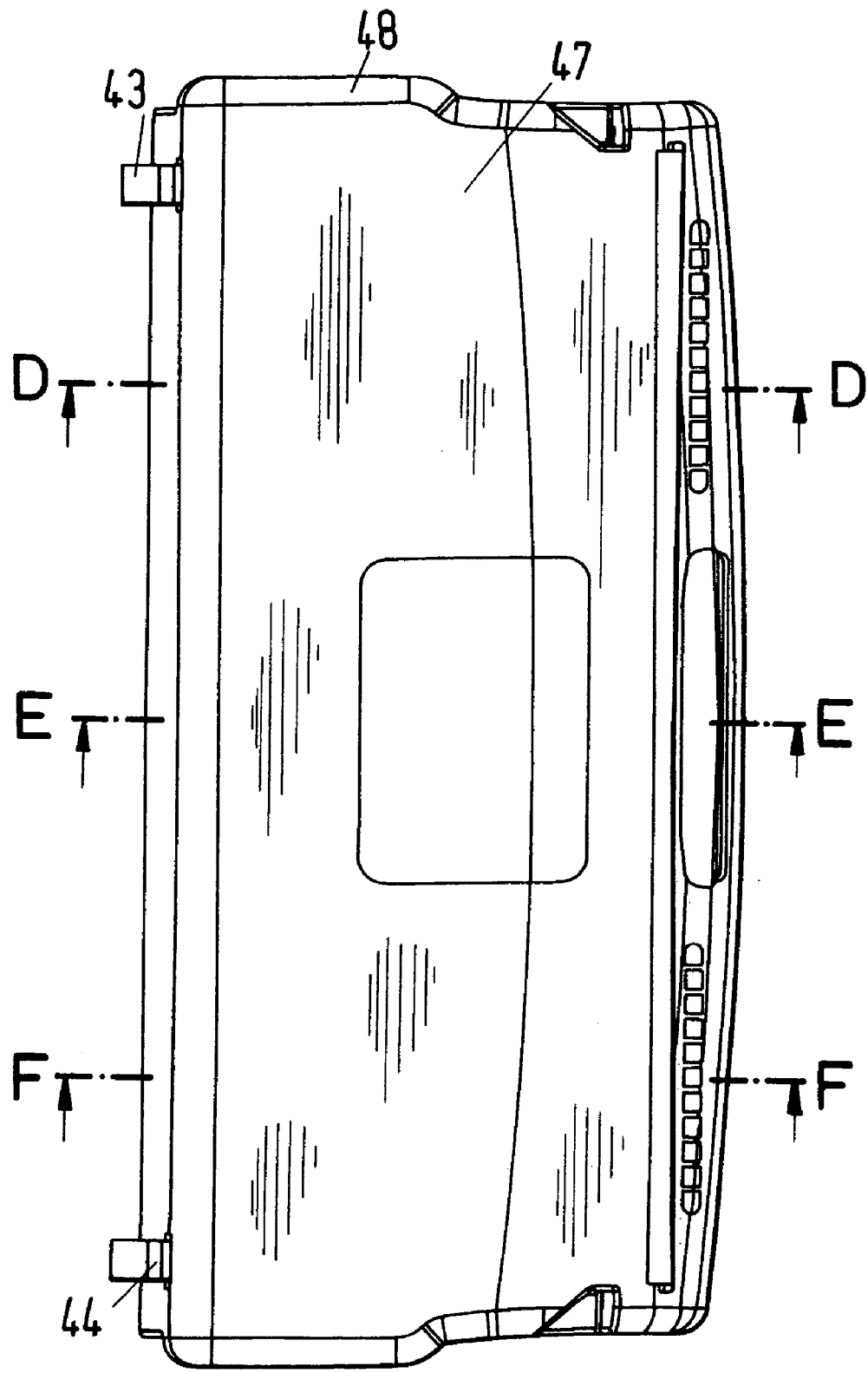
Figure 10:
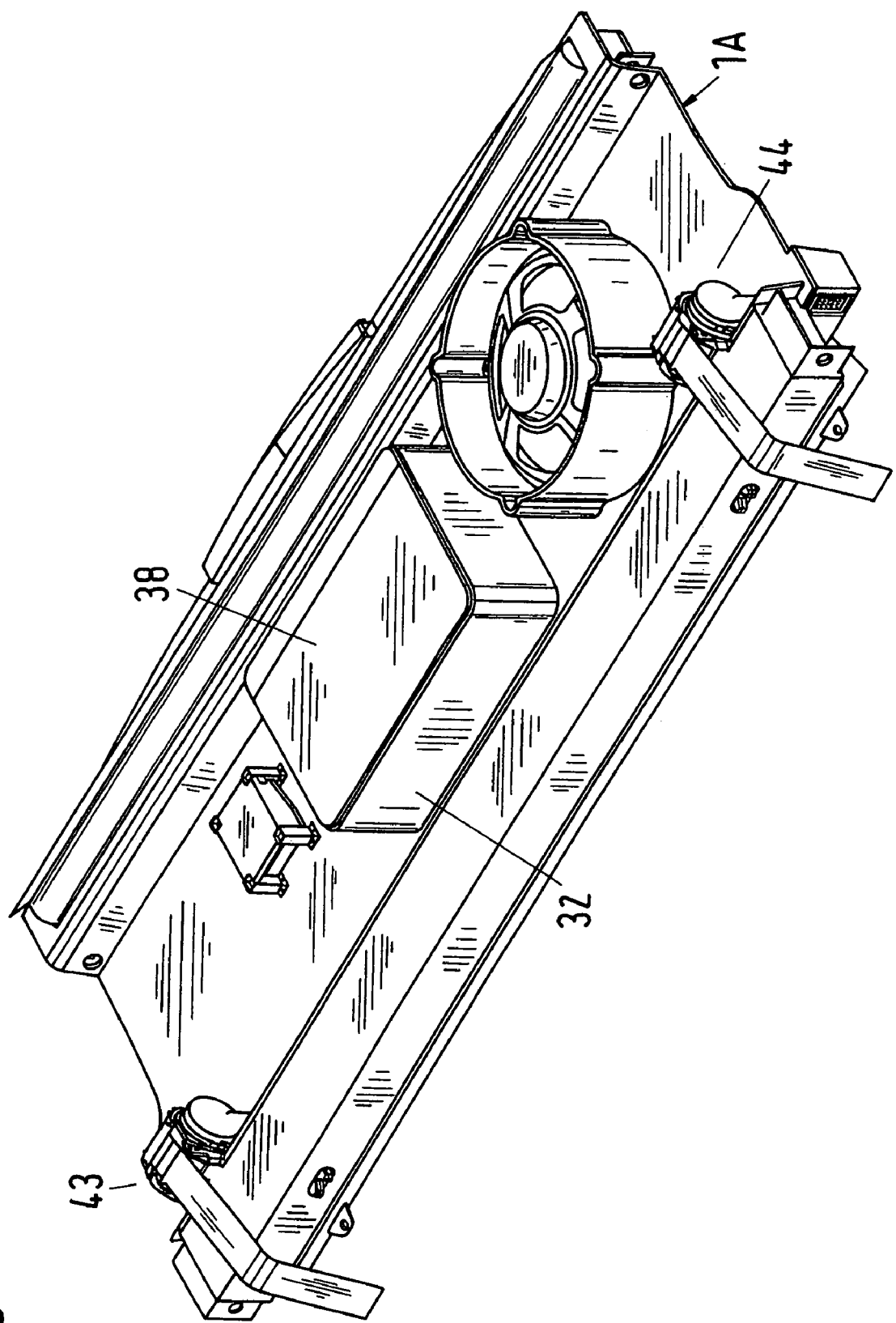
Figure 11:
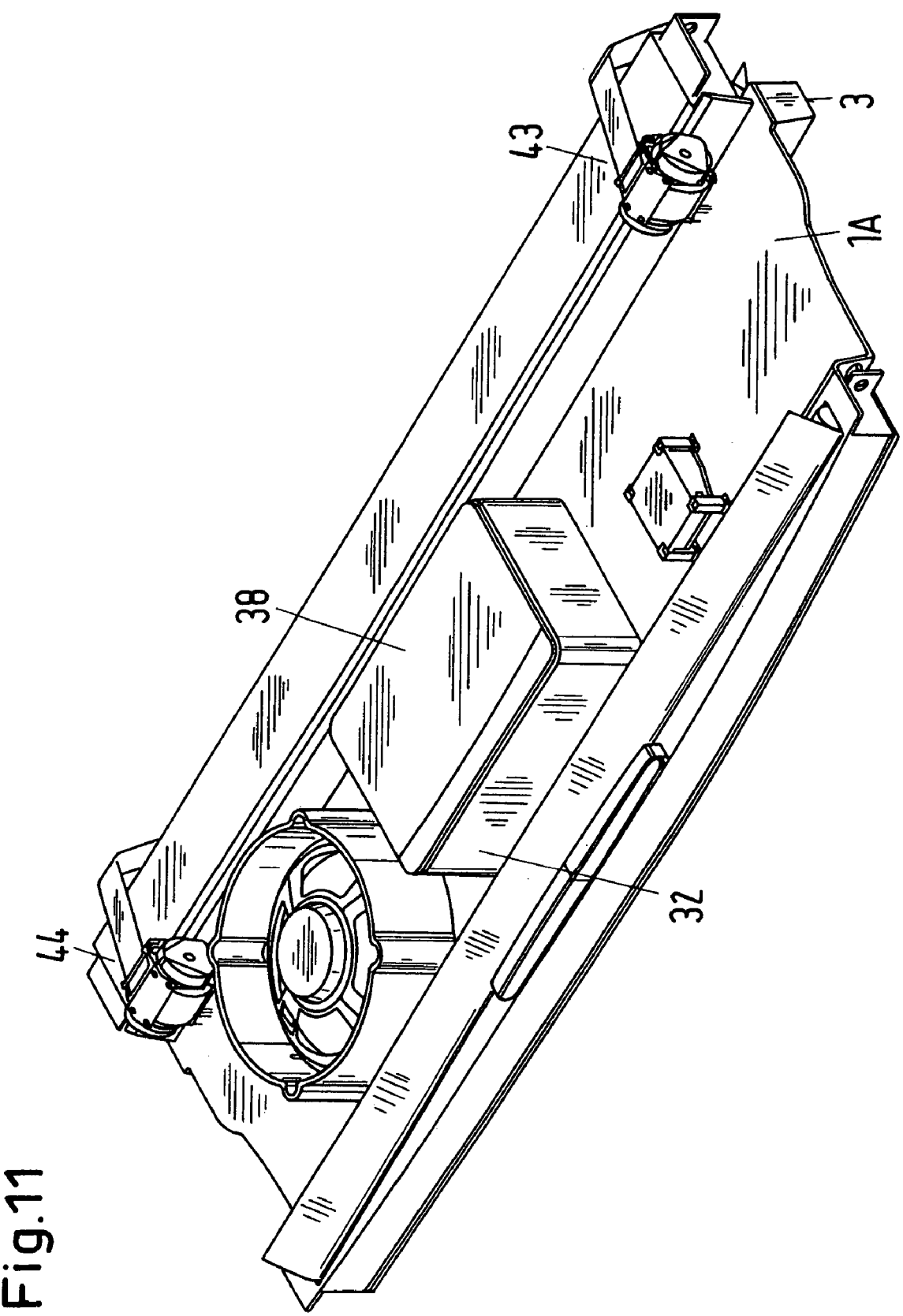
Figure 12:
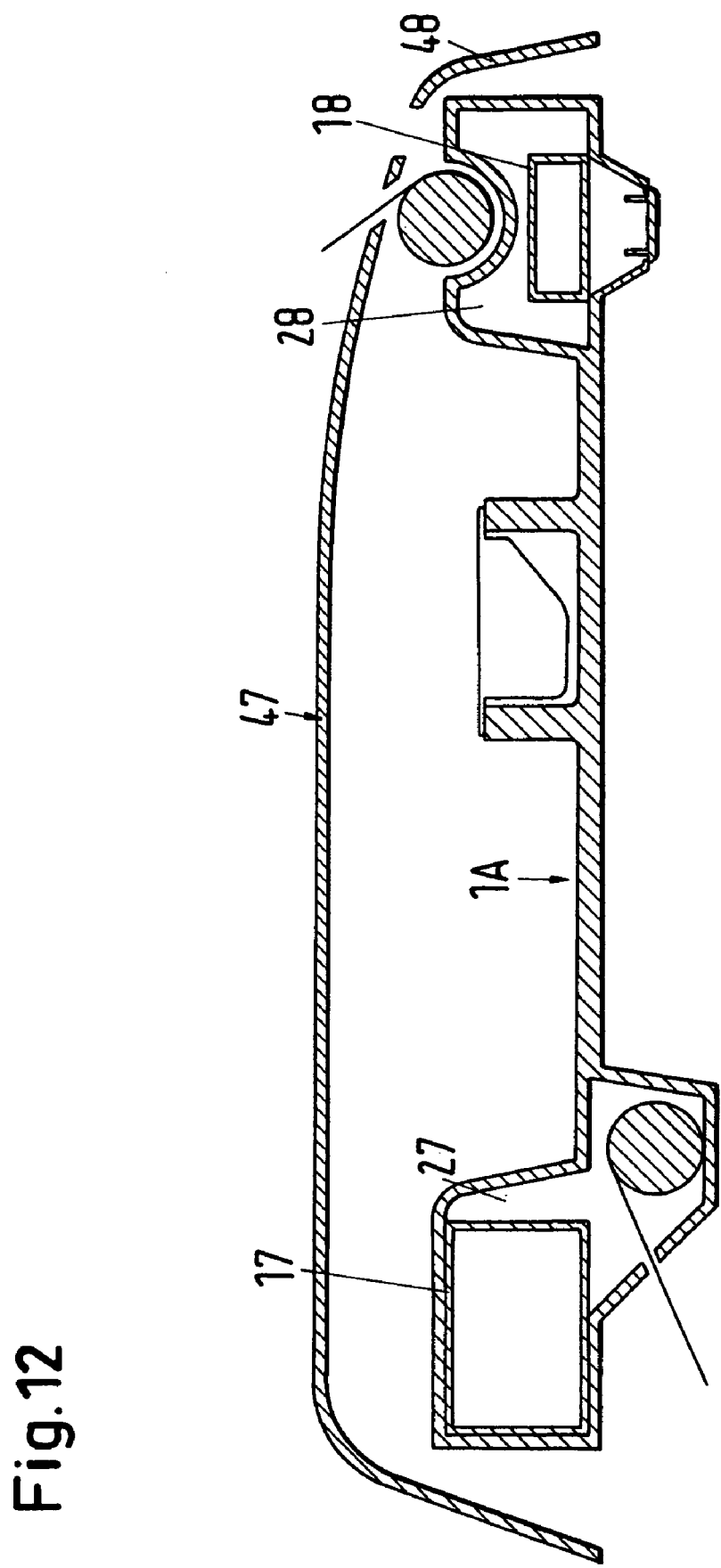
Figure 13:
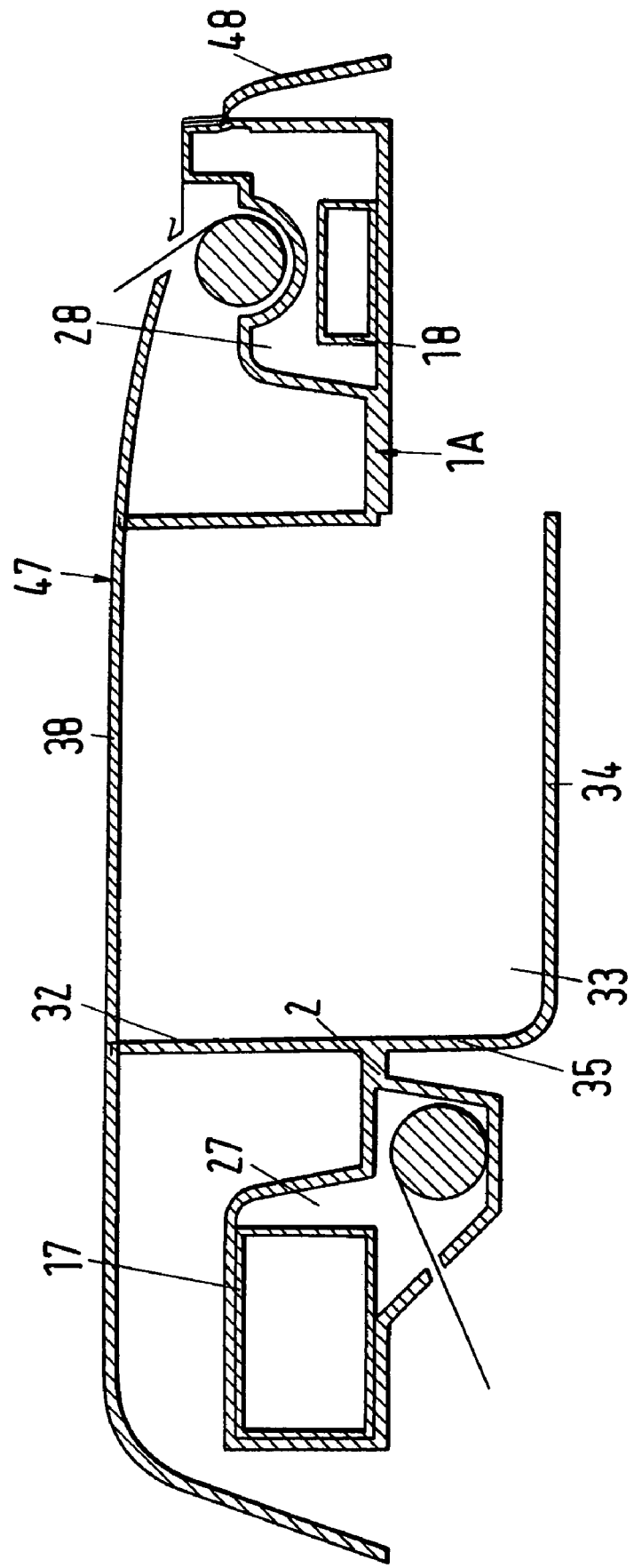
Figure 14:
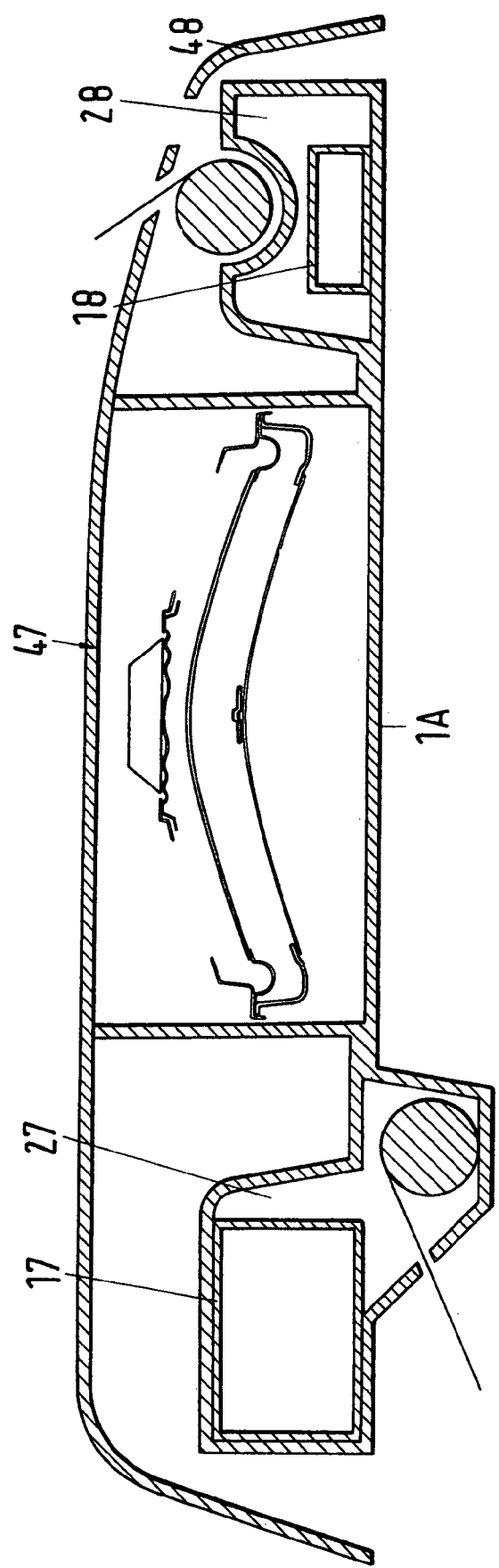
Figure 15:
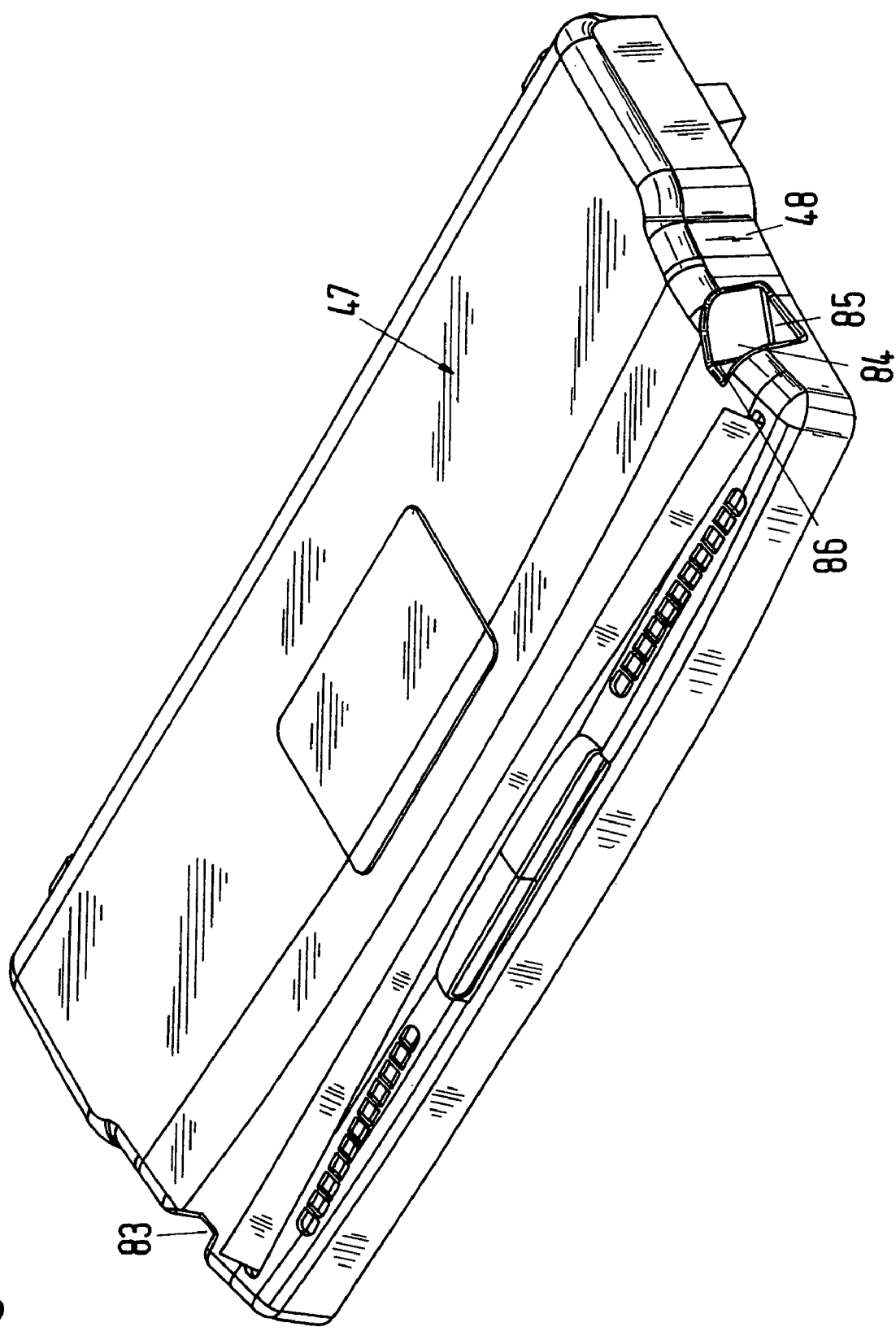
Figure 16:
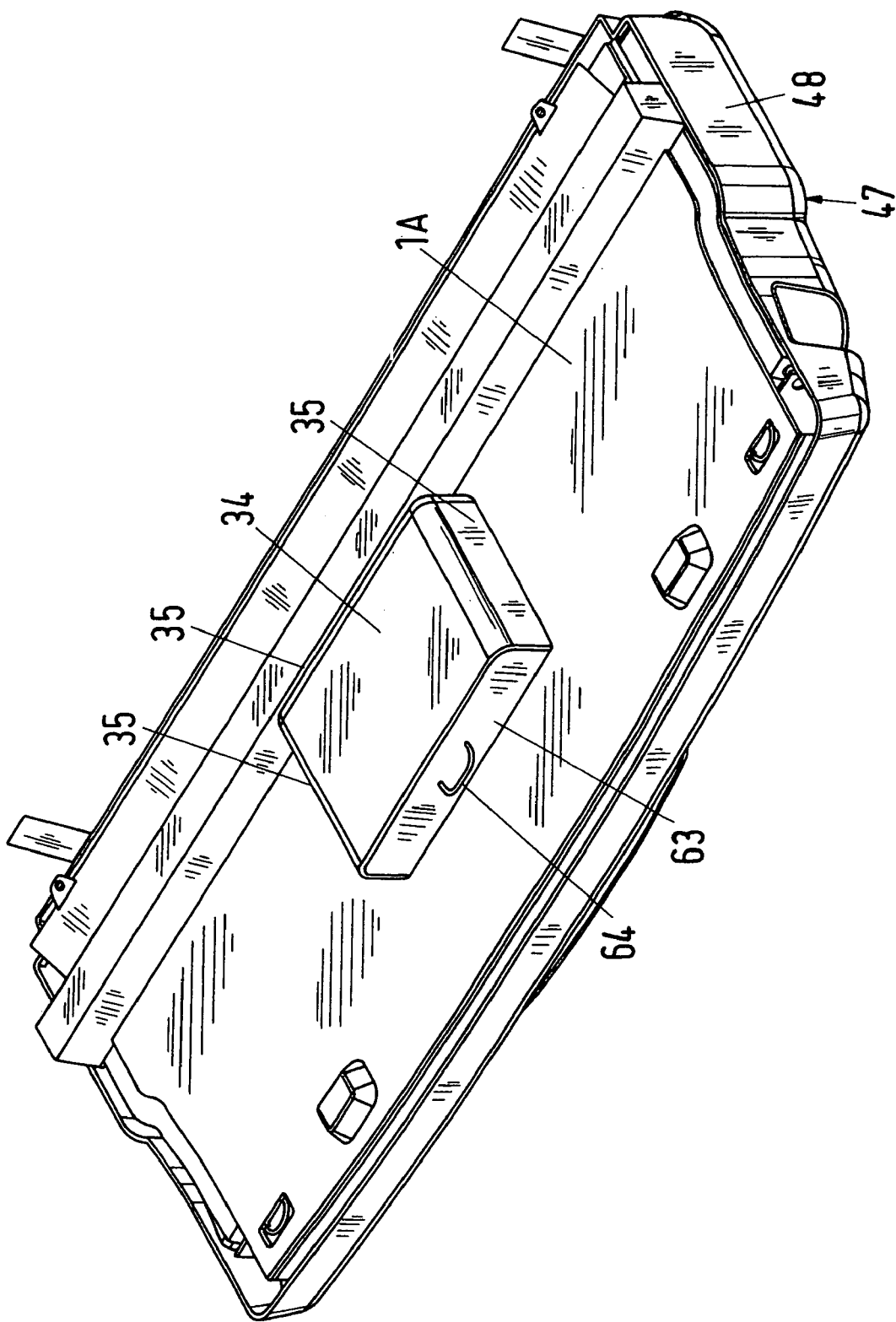
Figure 17:
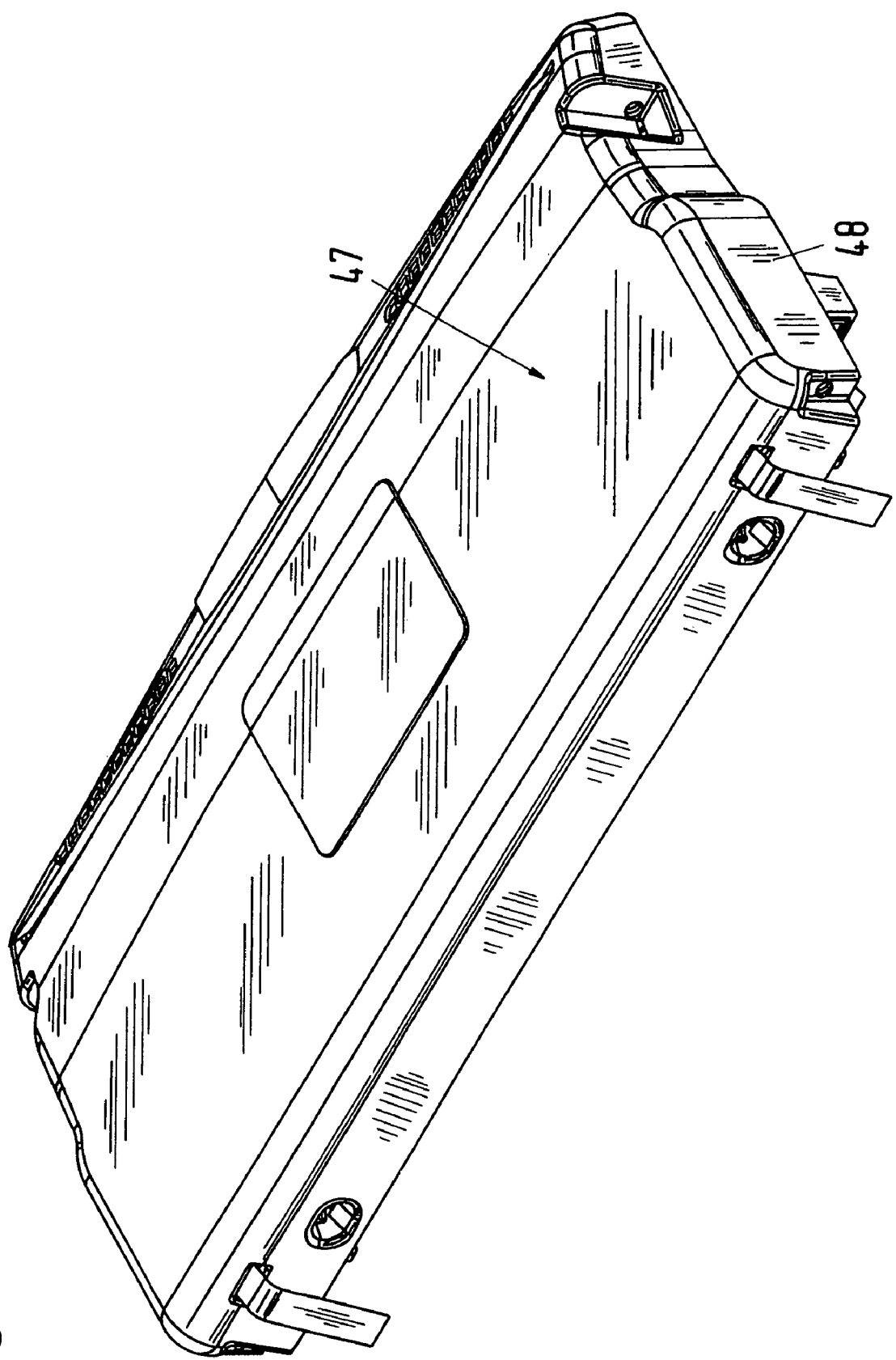
Figure 18:
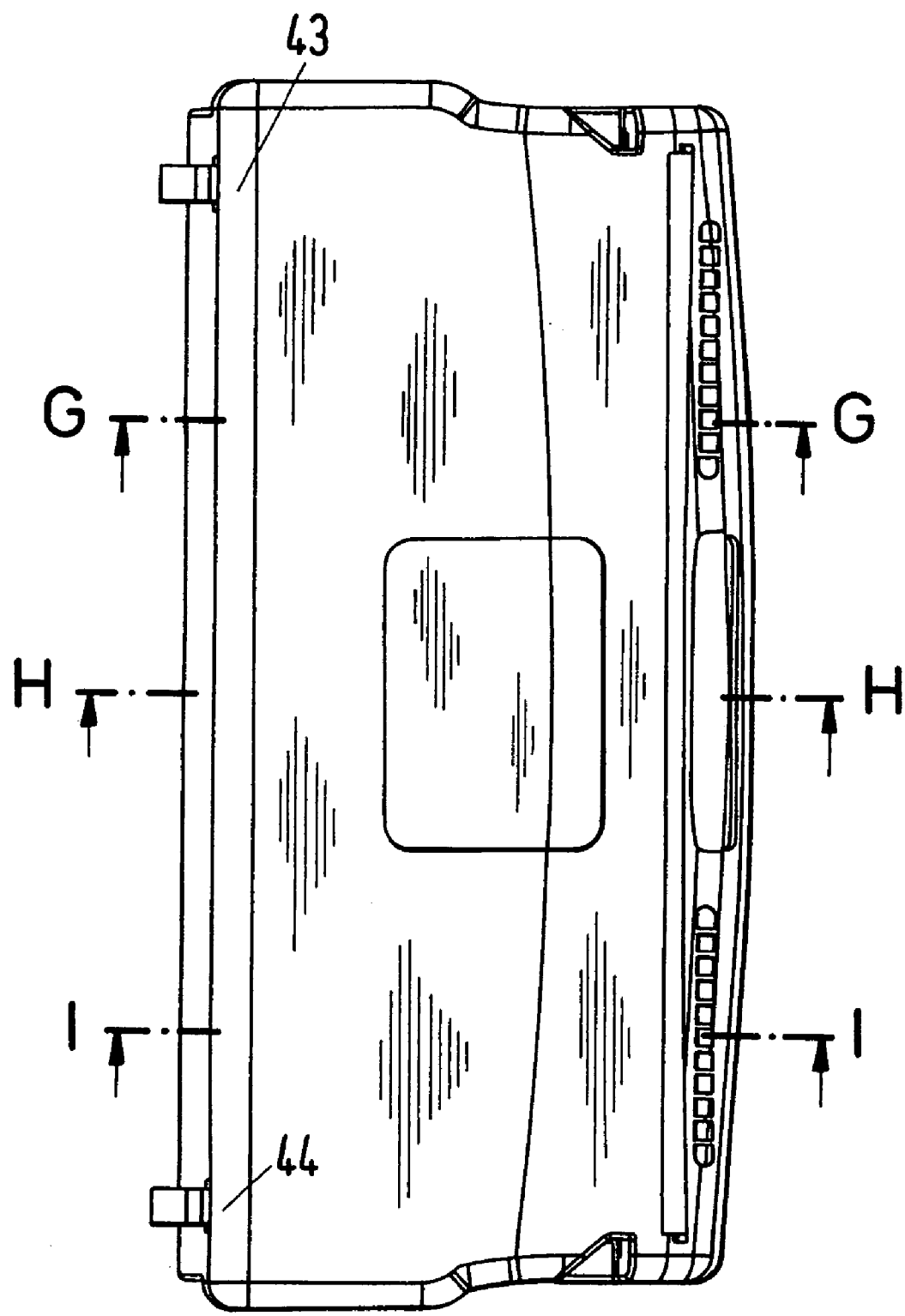
Figure 19:
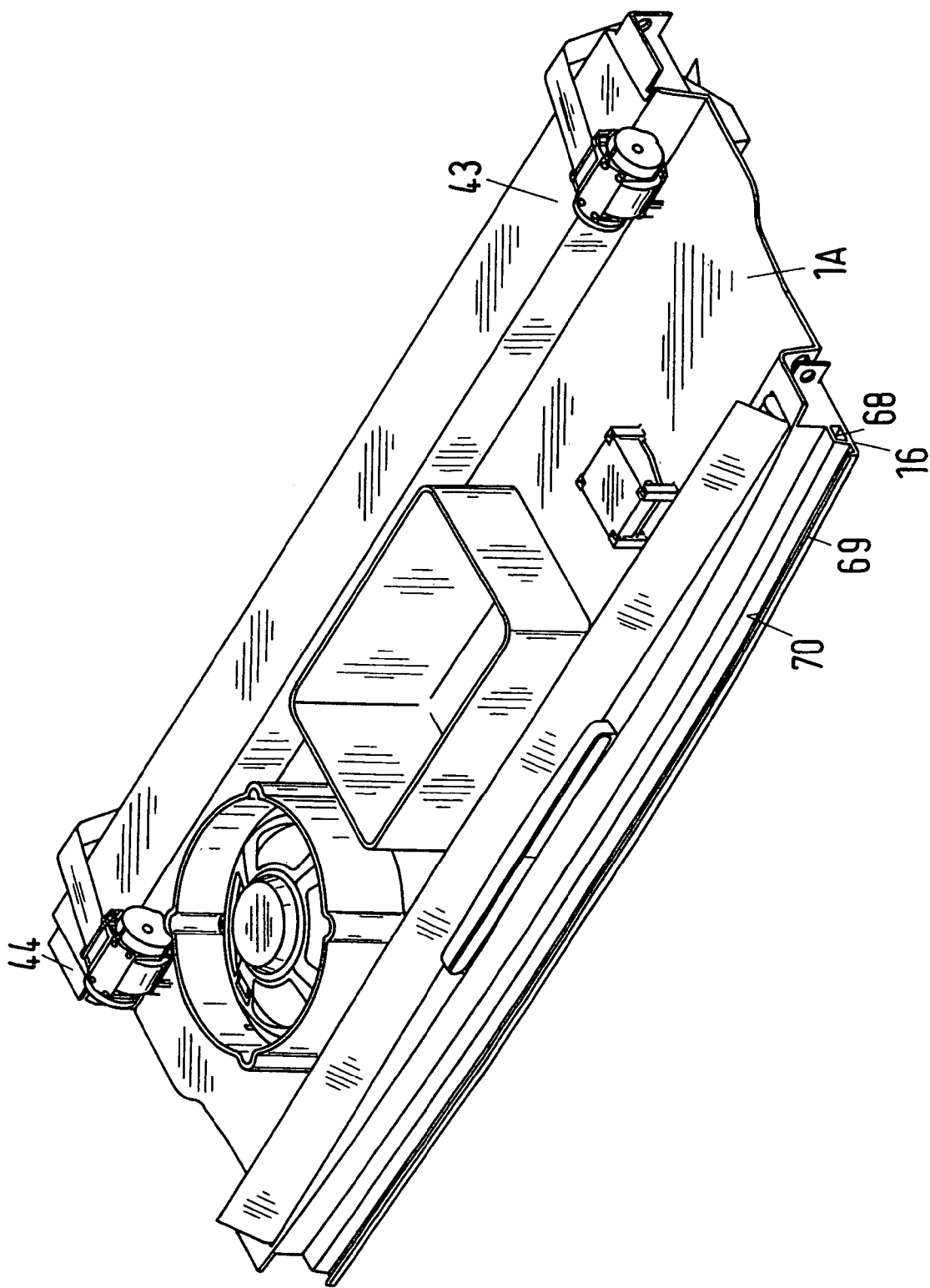

FIGS. 7 and 15 show, by way of example, a depression 83, 84 in the edge 48 of the covering 47 on the narrow sides in each instance. It is limited by walls lying oblique to one another, which converge in the direction of the floor 85 and/or in the direction of the rear wall 86 of the depression 83, 84. In the installed position, with the side walls of the depressions 83, 84 the covering 47 rests on corresponding body-side surfaces running obliquely. Because of the converging side walls of the depressions 83, 84, bracing of the covering 47 and hence of the rack in the installed position is obtained. In conjunction with the described fastening of the rack by means of the hollow support 18, effective fastening of the rack in the motor vehicle is obtained.

What is claimed is:

1. A rack for vehicles, comprising a basic member on which at least one functional part is provided, said basic member comprising at least one dimensionally stable support, which has mountings for a variety of functional parts, and said at least one dimensionally stable support at least partially covers at least one reinforcing element comprising a hollow section part.

2. The rack according to claim 1, wherein the basic member is made of two dimensionally stable supports, which are at least partially firmly joined together lying on each other.

3. The rack according to claim 1, wherein the rack has a single support.

4. The rack according to claim 1, wherein at least one support is designed dish-like.

5. The rack according to claim 2, wherein the two supports include a substantially flat central part and said supports lie on each other at said substantially flat central part.

6. The rack according to claim 1, wherein the reinforcing element is surrounded by said at least one support.

7. The rack according to claim 1, wherein said reinforcing element is provided near an edge of the rack.

8. The rack according to claim 1, wherein two reinforcing elements, lying substantially parallel to each other, are provided.

9. The rack according to claim 8, wherein the two reinforcing elements are provided at edges of the rack lying opposite one another.

10. The rack according to claim 1, wherein at least one support has a mounting for a take-up shaft.

11. The rack according to claim 10, wherein the mounting is provided near an edge of the rack.

12. The rack according to claim 10, wherein the mounting is formed by a profile section of the one support.

13. The rack according to claim 10, wherein the mounting is provided in the region below the central part of the one support.

14. The rack according to claim 10, wherein the mounting is partially covered by the reinforcing element.

15. The rack according to claim 10, wherein at least two supports are provided, the mounting is partially covered by the other support of said at least to support.

16. The rack according to claim 15, wherein said at least the other support has an additional mounting for an additional take-up shaft.

17. The rack according to claim 16, wherein the additional mounting is provided near an edge of the rack.

18. The rack according to claim 16, wherein the additional mounting is formed by a profile section of the other support.

19. The rack according to claim 16, wherein the additional mounting is provided in the region above the central part of the other support.

20. The rack according to claim 16, wherein the additional mounting is a depression, semicircular in cross section.

21. The rack according to claim 1, wherein the at least one support is provided with at least one mounting space for at least one illuminating means.

22. The rack according to claim 21, wherein the mounting space is closed by the reinforcing element.

23. The rack according to claim 21, wherein the mounting space is a depression in a support.

24. The rack according to claim 21, wherein the mounting space is closed by a floor permeable to light.

25. The rack according to claim 24, wherein the floor is held detachable.

26. The rack according to claim 1, wherein the rack has at least one storage space.

27. The rack according to claim 26, wherein the storage space is limited by at least one support.

28. The rack according to claim 26, wherein the storage space is open on at least one side.

29. The rack according to claim 26, wherein the storage space has a floor, which lies in the region below the central part of the one support.

30. The rack according to claim 26, wherein the storage space is limited by side walls of said at least one support.

31. The rack according to claim 30, wherein the side wall of the support is a ring wall.

32. The rack according to claim 26, wherein the storage space is provided in approximately half the length and/or width of the rack.

33. The rack according to claim 30, wherein the side walls of the storage space are designed in one piece with the support.

34. The rack according to claim 1, wherein the rack is provided with at least one loudspeaker mounting.

35. The rack according to claim 34, wherein the loudspeaker mounting is limited by a mounting ring.

36. The rack according to claim 35, wherein the mounting ring is designed in one piece with the support.

37. The rack according to claim 34, wherein the loudspeaker mounting is located in the region beside the storage space.

38. The rack according to claim 35, wherein the mounting ring has the same height as a side wall of the support partially limiting the storage space.

39. The rack according to claim 1, further comprising at least one belt roll-up is fastened to said at least one support.

40. The rack according to claim 39, wherein the rack absorbs the forces transmitted by the belt roll-up in the event of danger and conducts them into the body of the vehicle.

41. The rack according to claim 1, wherein mountings for a backrest of a folding rear seat of the vehicle are provided on said at least one support.

42. The rack according to claim 1, wherein the rack has at least one covering.

43. The rack according to claim 42, wherein the covering has a pass-through opening for a safety belt of a belt roll-up.

44. The rack according to claim 42, wherein the covering has an additional pass-through opening for a sunshade roller blind.

45. The rack according to claim 42, wherein the covering has a pulled-down edge engaging over the rack.

46. The rack according to claim 42, wherein the covering has an opening at the height of the storage space.

47. The rack according to claim 46, wherein the opening is closable by a cover.

48. The rack according to claim 1, wherein the support comprises metal.

49. The rack according to claim 1, wherein the rack is arranged to be removable in the vehicle.

50. The rack according to claim 1, wherein at least one signal light is provided on one of the supports.

51. The rack according to claim 50, wherein the covering has an opening for the signal light.

52. The rack according to claim 1, wherein the rack is an inherently rigid built-in module.

53. The rack according to claim 1, wherein the rack is a complete prefabricated unit.

54. The rack according to claim 1, wherein the rack has a locking mechanism for a backrest of the vehicle.

55. The rack according to claim 54, wherein the reinforcing element is provided for locking the backrest.

56. The rack according to claim 1, wherein the reinforcing element is a connecting element by which the rack is to be connected to the body of the vehicle.

* * * * *